United States Patent
Takeuchi

(10) Patent No.: US 7,898,211 B2
(45) Date of Patent: Mar. 1, 2011

(54) DRIVING CIRCUIT FOR MOTOR AND DEVICE EQUIPPED WITH DRIVING CIRCUIT

(75) Inventor: Kesatoshi Takeuchi, Shiojiri (JP)

(73) Assignee: Seiko Epson Corporation (JP)

( * ) Notice: Subject to any disclaimer, the term of this patent is extended or adjusted under 35 U.S.C. 154(b) by 289 days.

(21) Appl. No.: 12/203,545

(22) Filed: Sep. 3, 2008

(65) Prior Publication Data
US 2009/0058338 A1 Mar. 5, 2009

(30) Foreign Application Priority Data
Sep. 5, 2007 (JP) .............................. 2007-229965

(51) Int. Cl.
H02P 7/29 (2006.01)
(52) U.S. Cl. ..................... 318/811; 318/599; 388/811
(58) Field of Classification Search .................. 318/599, 318/811, 806, 822, 823, 437, 687, 38, 135; 388/804, 811, 819
See application file for complete search history.

(56) References Cited

U.S. PATENT DOCUMENTS

| 4,975,662 | A | 12/1990 | Takeuchi | |
| 5,185,584 | A | 2/1993 | Takeuchi | |
| 5,241,251 | A * | 8/1993 | Wakui | 318/599 |
| 5,524,103 | A * | 6/1996 | Shimizu et al. | 369/59.19 |
| 5,629,650 | A * | 5/1997 | Gersbach et al. | 331/17 |
| 6,535,468 | B2 * | 3/2003 | Akiyama et al. | 369/47.52 |
| 6,882,060 | B2 * | 4/2005 | Matsuo et al. | 290/52 |
| 2005/0162105 | A1 * | 7/2005 | Yamasaki et al. | 318/114 |
| 2005/0245997 | A1 * | 11/2005 | Holjo et al. | 607/88 |

FOREIGN PATENT DOCUMENTS

| JP | 61224896 A | * 10/1986 |
| JP | 02-256311 | 10/1990 |
| JP | 2001166831 A | * 6/2001 |
| WO | WO 2005/112230 | 11/2005 |

* cited by examiner

Primary Examiner—Walter Benson
Assistant Examiner—Eduardo Colon-Santana
(74) Attorney, Agent, or Firm—Harness, Dickey & Pierce, P.L.C.

(57) ABSTRACT

The circuit structured to drive a motor is provided. The circuit includes: a division signal generator that generates a division signal dividing each of a high level period and a low level period of a binary position signal representing a relative position of a magnetic coil to a permanent magnet into a preset number of multiple divisions; a pulse width setter that sets a pulse width for PWM control corresponding to each of the multiple divisions represented by the division signal; and a PWM signal generator that performs PWM control with the set pulse width, thereby generating a PWM signal as a driving signal for driving the motor.

13 Claims, 25 Drawing Sheets

Back electromotive force Ec

Sensor output SSD

Position when non-excited (phase= $\alpha \pm n\pi$)

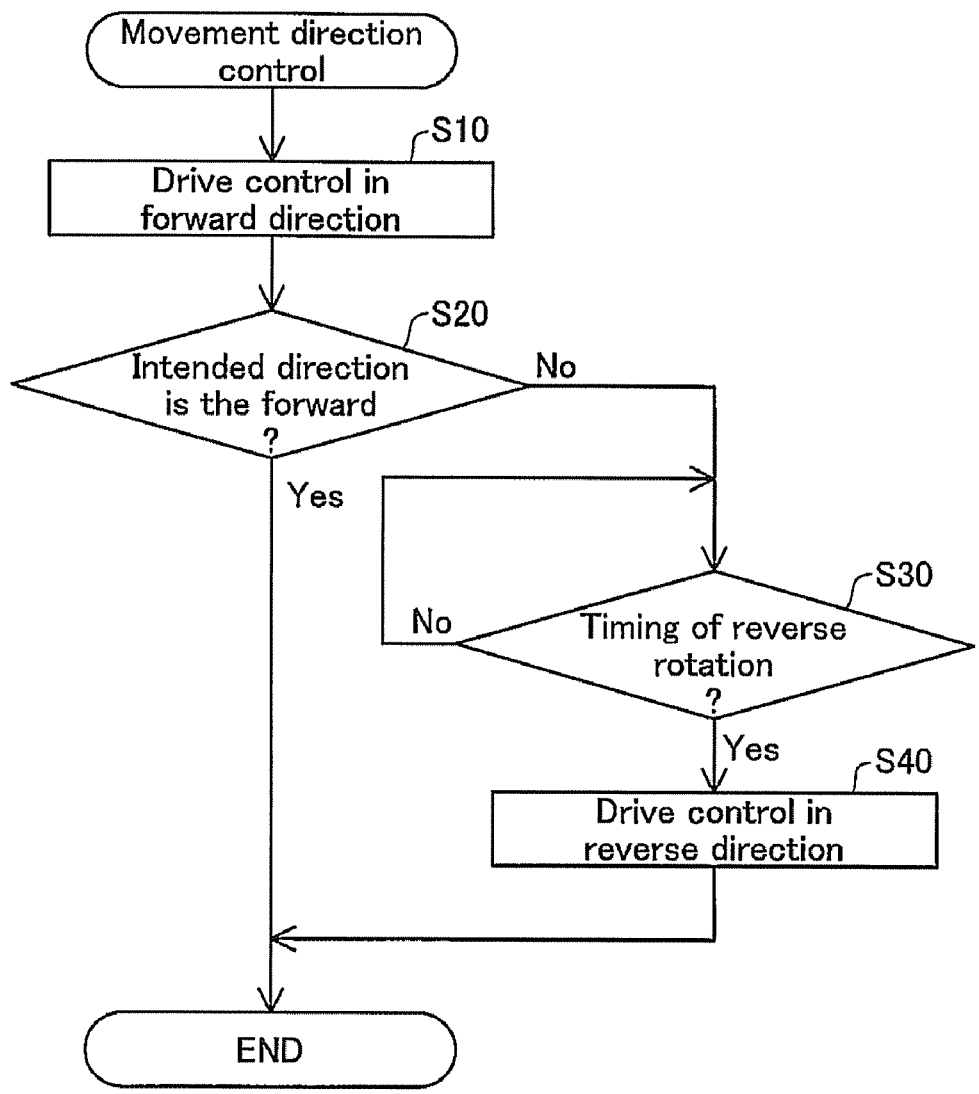

Operation of first bridge circuit 250a

Operation of second bridge circuit 250b 2-pole parallel winding 2-pole series winding 4-pole parallel winding 4-pole series winding During forward rotation (RI="L")

Operation coefficient
K0=15

| ADD | Normalized X= | Operation result Sine function | WD (Decimal number) | WD (Hexadecimal number) |
|---|---|---|---|---|
| 0 | 0.000 | 0.00 | 0 | 0h |
| 1 | 0.077 | 3.59 | 4 | 4h |
| 2 | 0.154 | 6.97 | 7 | 7h |
| 3 | 0.231 | 9.95 | 10 | Ah |
| 4 | 0.308 | 12.34 | 12 | Ch |
| 5 | 0.385 | 14.03 | 14 | Eh |
| 6 | 0.462 | 14.89 | 15 | Fh |
| 7 | 0.538 | 14.89 | 15 | Fh |
| 8 | 0.615 | 14.03 | 14 | Eh |
| 9 | 0.692 | 12.34 | 12 | Ch |
| 10 | 0.769 | 9.95 | 10 | Ah |
| 11 | 0.846 | 6.97 | 7 | 7h |
| 12 | 0.923 | 3.59 | 4 | 4h |
| 13 | 1.000 | 0.00 | 0 | 0h |

Operation coefficients
K0=15
K1=−2.270 × 10⁻¹³
K2=−4.685 × 10⁰
K3=4.350 × 10⁰
K4=−3.286 × 10⁻²

| ADD | Normalized X= | Operation result Cubic function | WD | |
|---|---|---|---|---|
| | | | Decimal number | Hexadecimal number |
| 0 | 0.000 | −0.493 | 0 | 0h |
| 1 | 0.077 | 4.111 | 4 | 4h |
| 2 | 0.154 | 7.882 | 8 | 8h |
| 3 | 0.231 | 10.823 | 11 | Bh |
| 4 | 0.308 | 12.931 | 13 | Dh |
| 5 | 0.385 | 14.208 | 14 | Eh |
| 6 | 0.462 | 14.654 | 15 | Fh |
| 7 | 0.538 | 14.268 | 14 | Eh |
| 8 | 0.615 | 13.050 | 13 | Dh |
| 9 | 0.692 | 11.001 | 11 | Bh |
| 10 | 0.769 | 8.120 | 8 | 8h |
| 11 | 0.846 | 4.407 | 4 | 4h |
| 12 | 0.923 | −0.137 | 0 | 0h |
| 13 | 1.000 | −5.512 | 0 | 0h |

DRIVING CIRCUIT FOR MOTOR AND DEVICE EQUIPPED WITH DRIVING CIRCUIT

CROSS-REFERENCE TO RELATED APPLICATIONS

The present application claims the priority based on Japanese Patent Application No. 2007-229965 filed on Sep. 5, 2007, the disclosure of which is hereby incorporated by reference in its entirety.

BACKGROUND OF THE INVENTION

1. Field of the Invention

The present invention relates to a circuit structured to drive a motor.

2. Description of the Related Art

A proposed technique relating to the circuit structured to drive a motor is disclosed in, for example, International Publication No. WO2005/112230A1.

The proposed technique applies an analog output-type hall element to detect a positional relation of magnetic coils to permanent magnets. PWM control is performed with an analog signal input from the hall element to generate a driving signal for driving a brushless motor. The proposed technique is, however, not applicable to a digital output-type hall element configured to output a binary digital signal representing the positional relation of the magnetic coils to the permanent magnets. The PWM control is not performable with the digital output-type hall element to generate the driving signal.

SUMMARY

An object of the present invention is to provide technology that is able to generate a driving signal for driving a motor by PWM control with a binary signal input from a position sensor.

According to an aspect of the present invention, a circuit structured to drive a motor is provided. The circuit structured to drive a motor comprises: a division signal generator that generates a division signal dividing each of a high level period and a low level period of a binary position signal representing a relative position of a magnetic coil to a permanent magnet into a preset number of multiple divisions; a pulse width setter that sets a pulse width for PWM control corresponding to each of the multiple divisions represented by the division signal; and a PWM signal generator that performs PWM control with the set pulse width, thereby generating a PWM signal as a driving signal for driving the motor.

The circuit according to this aspect of the invention divides each of the high level period and the low level period of the position signal into the multiple divisions in response to the division signal and sets the pulse width for PWM control corresponding to each of the multiple divisions. This arrangement enables the driving signal for driving the motor to be generated by PWM control with the binary signal input from a position sensor.

The present invention may be reduced to practice in various forms, for example, as a method and a device for drive control of an electric motor; a drive control semiconductor device; a drive control system; a computer program for accomplishing the functions of such a method or device; a recording medium having such a computer program recorded thereon; an electric motor furnished with a drive control circuit; a electric device, a projector, a mobile device, a robot, and a movable body, and a fuel cell device equipped with the electric motor; and so on.

BRIEF DESCRIPTION OF THE DRAWINGS

FIG. 6 is a flowchart illustrating the control process of the direction of movement of the motor.

DESCRIPTION OF THE PREFERRED EMBODIMENT

Next, aspects of the present invention will be described in the following order on the basis of embodiments:
A. First Embodiment:
B. Second Embodiment:
C. Third Embodiment:
D. Fourth Embodiment:
E. Modified Examples:

A. First Embodiment

A1. Overview of Motor Configuration and Operation

Figure 1B:
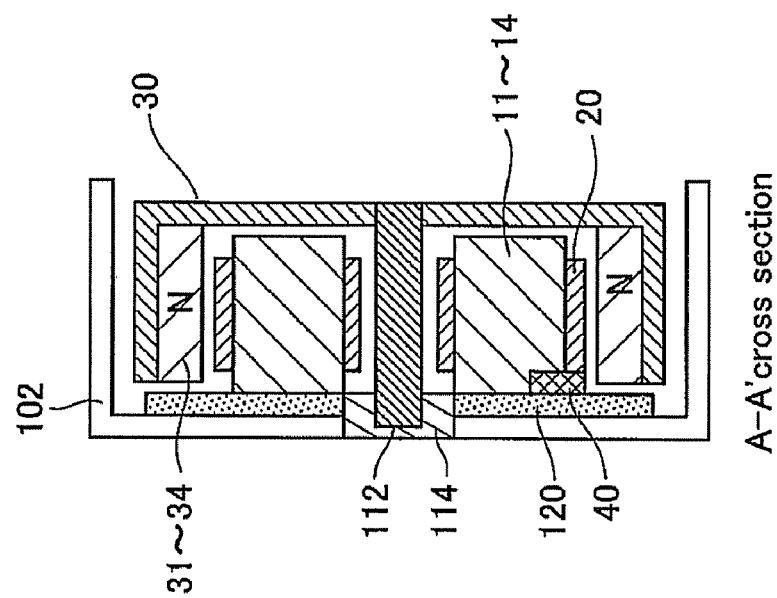
FIGS. 1A and 1B are sectional views depicting the configuration of the motor unit of a single-phase brushless motor in a first embodiment.
Figure 1A:
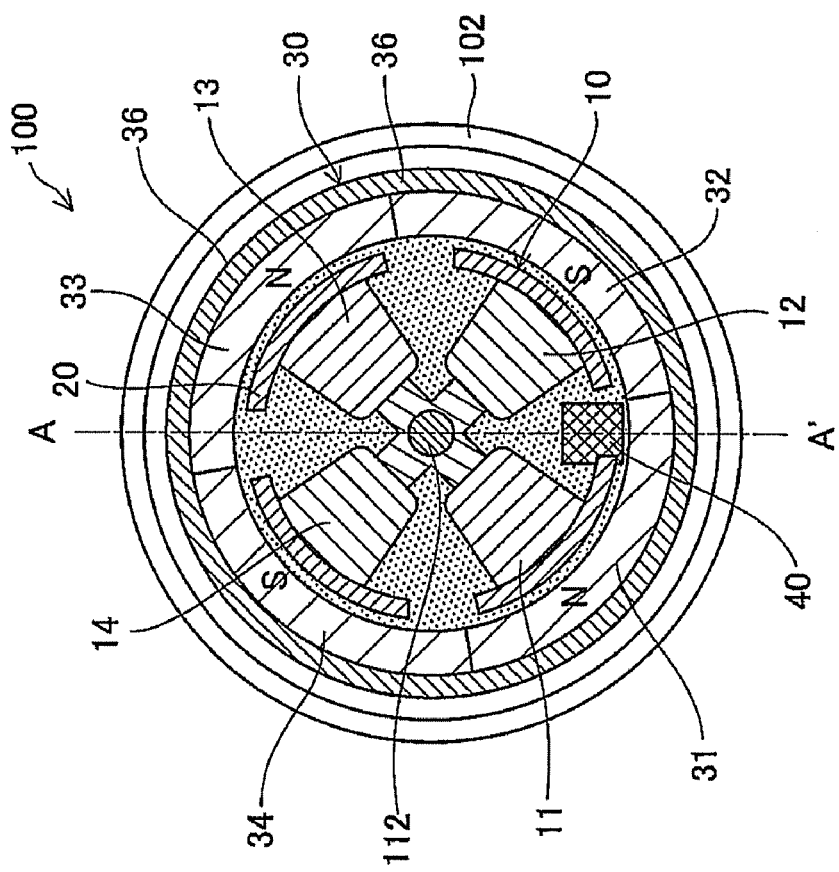

FIGS. 1A and 1B are sectional views depicting the configuration of the motor unit of a single-phase brushless motor in a first embodiment. This motor unit 100 has a stator portion 10 and a rotor portion 30, each of generally cylindrical tube shape. The stator portion 10 has four coils 11-14 arranged in a generally cross-shaped pattern, and a magnetic sensor 40 positioned at a center location between two of the coils 11, 12. The magnetic sensor 40 is used to detect the position of the rotor portion 30 (i.e. the phase of the motor). Each coil 11-14 is provided with a magnetic yoke 20 formed of a magnetic material. The coils 11-14 and the magnetic sensor 40 are affixed on a circuit board 120 (FIG. 1B). The circuit board 120 is affixed to a casing 102. The cover of the casing 102 is omitted in the drawing.

The rotor portion 30 has four permanent magnets 31-34; the center axis of the rotor portion 30 constitutes a rotating shaft 112. This rotating shaft 112 is supported by a shaft bearing portion 114 (FIG. 1B). The direction of magnetization of the magnets extends in a direction radially outward from the rotating shaft 112. A magnetic yoke 36 is disposed to the outside of the magnets 31-34. This magnetic yoke 36 may be omitted.

Figure 2A:
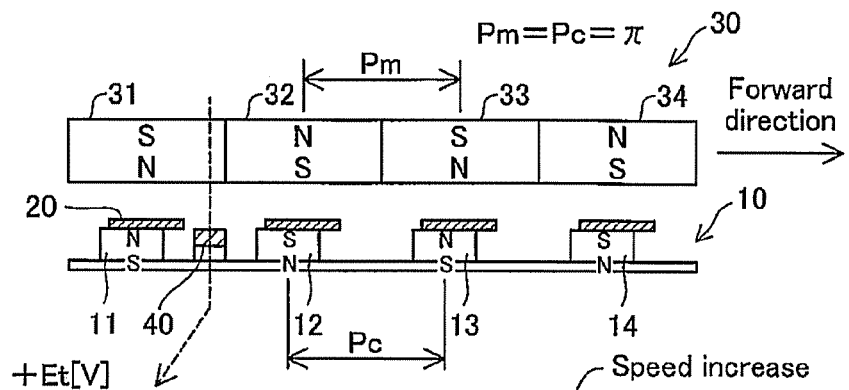
FIG. 2A illustrates the positional relationship of a magnet array and a coil array.
Figure 2B:
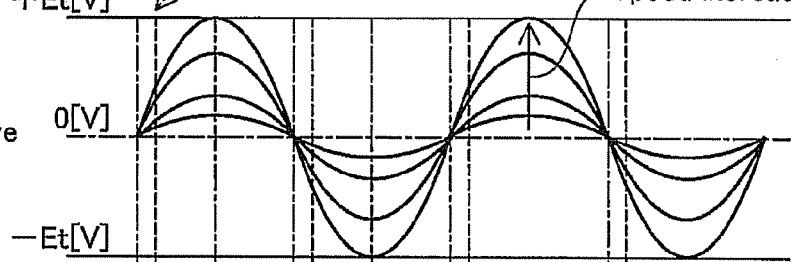
FIGS. 2B and 2C show the relationship of magnetic sensor output to back electromotive force waveform.
Figure 2C:
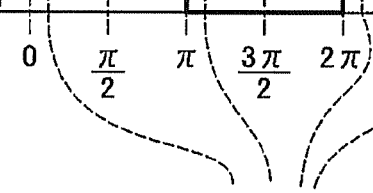

FIG. 2A illustrates the positional relationship of a magnet array and a coil array. FIGS. 2B and 2C show the relationship of magnetic sensor output to back electromotive force waveform. As shown in FIG. 2A, the four magnets 31-34 are arranged at constant magnetic pole pitch Pm, with adjacent magnets being magnetized in opposite directions. The coils 11-14 are arranged at constant pitch Pc, with adjacent coils being excited in opposite directions. In this example, the magnetic pole pitch Pm is equal to the coil pitch Pc, and is equivalent to $\pi$ in terms of electrical angle. An electrical angle of $2\pi$ is associated with the mechanical angle or distance of displacement when the phase of the driving signal changes by $2\pi$. In the present embodiment, when the phase of the driving signal changes by $2\pi$, the rotor portion 30 undergoes displacement by the equivalent of twice the magnetic pole pitch Pm.

Of the four coils 11-14, the first and third coils 11, 13 are driven by driving signals of identical phase, while the second and fourth coils 12, 14 are driven by driving signals whose phase is shifted by 180 degrees ($=\pi$) from the driving signals of the first and third coils 11, 13. In ordinary two-phase driving, the phases of the driving signals of the two phases (Phase A and Phase B) would be shifted by 90 degrees ($=\pi/2$); in no instance would they be shifted by 180 degrees ($=\pi$).

Also, in most motor drive methods, two driving signals phase-shifted by 180 degrees ($=\pi$) would be viewed as having identical phase. Consequently, the drive method of the motor in the present embodiment can be though of as single-phase driving.

FIG. 2A shows the positional relationship of the magnets 31-34 and the coils 11-14, with the motor at a stop. In the motor of this embodiment, the magnetic yoke 20 provided to each of the coils 11-14 is offset slightly towards the direction of normal rotation of the rotor portion 30, with respect to the center of the coil. Consequently, when the motor stops, the magnetic yoke 20 of each coil will be attracted by the magnets 31-34, bringing the rotor portion 30 to a halt at a position with the magnetic yokes 20 facing the centers of the magnets 31-34. As a result, the motor will come to a halt at a position with the centers of the coils 11-14 offsetted with respect to the centers of the magnets 31-34. The magnetic sensor 40 is also situated at a position offsetted slightly from the boundary between adjacent magnets. The phase at this stop location is denoted as $\alpha$. While the $\alpha$ phase is not zero, it may be a value close to zero (e.g. about 5 to 10 degrees).

FIG. 2B shows waveforms of back electromotive force generated on the coil. FIG. 2C shows an output waveform of the magnetic sensor 40. The magnetic sensor 40 generates a sensor output SSD of a rectangular waveform in synchronism with a back electromotive force waveform on the coil during operation of the motor. The sensor output SSD of the magnetic sensor 40 has a non-zero value even at a stop of the motor (except in a phase range of $\pi$ to $2\pi$). The back electromotive force on the coil tends to increase with an increase in rotation speed of the motor, while maintaining its waveform (sine wave) in substantially similar shape. For example, a hall IC (digital output) based on the hall effect may be applied to the magnetic sensor 40. In this application, the sensor output SSD has a rectangular waveform, and the back electromotive force Ec has a sine or quasi-sine waveform. A drive control circuit of the motor utilizes the sensor output SSD to apply a voltage having a similar waveform to that of the back electromotive force Ec to the respective coils 11 to 14 as discussed later.

In general, an electric motor functions as an energy conversion device that converts between mechanical energy and electrical energy. The back electromagnetic force of the coils represents mechanical energy of the motor that has been converted to electrical energy. Consequently, where electrical energy applied to the coils is converted to mechanical energy (that is, where the motor is driven), it is possible to drive the motor with maximum efficiency by applying voltage of similar waveform to the back electromagnetic force. As will be discussed below, "similar waveform to the back electromagnetic force" means voltage that generates current flowing in the opposite direction from the back electromagnetic force.

Figure 3:
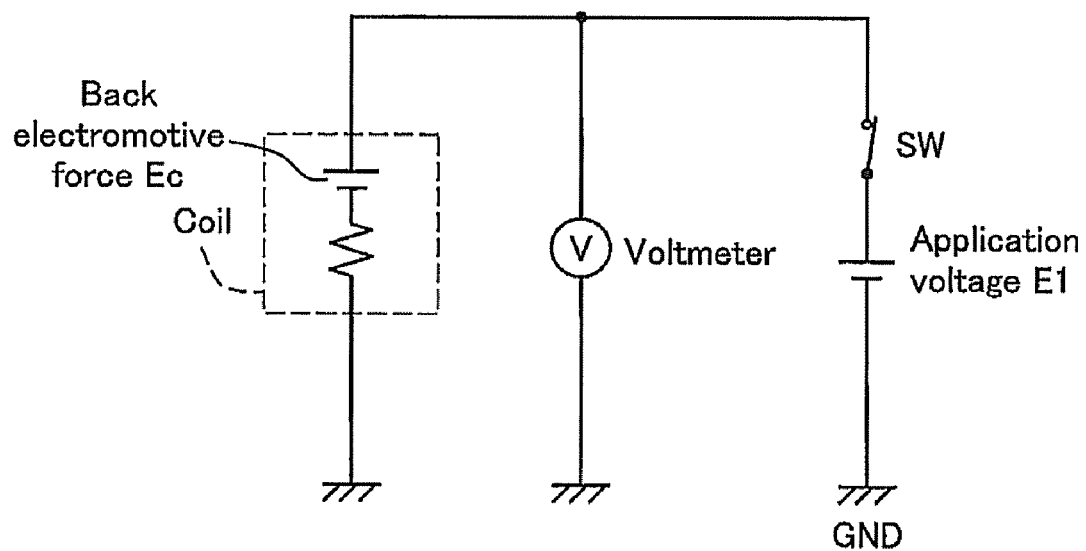
FIG. 3 is a model diagram illustrating the relationship of applied voltage to the coil and electromotive force.

FIG. 3 is a model diagram illustrating the relationship of applied voltage to the coil and electromotive force. Here, the coil is simulated in terms of back electromotive force Ec and resistance. In this circuit, a voltmeter V is parallel-connected to the application voltage E1 and the coil. When voltage E1 is applied to the motor to drive the motor, back electromotive force Ec is generated with a direction of current flow in opposition to that of the application voltage E1. When a switch SW is opened while the motor is rotating, the back electromotive force Ec can be measured with the voltmeter V. The polarity of the back electromotive force Ec measured with the switch SW open will be the same as the polarity of the application voltage E1 measured with the switch SW closed. The phrase "application of voltage of substantially similar waveform to the back electromagnetic force" herein refers to application of voltage having the same polarity as, and having waveform of substantially similar shape to, the back electromotive force Ec measured by the voltmeter V.

As noted previously, when driving a motor, it is possible to drive the motor with maximum efficiency through application of voltage of waveform similar to that of the back electromagnetic force. It can be appreciated that energy conversion efficiency will be relatively low in proximity to the midpoint (in proximity to 0 voltage) of the sine wave waveform of back electromotive force, while conversely energy conversion efficiency will be relatively high in proximity to the peak of the back electromotive force waveform. Where a motor is driven by applying voltage of waveform similar to that of the back electromotive force, relatively high voltage can be applied during periods of high energy conversion efficiency, thereby improving efficiency of the motor. On the other hand, if the motor is driven with a simple rectangular waveform for example, considerable voltage will be applied in proximity to the position where back electromotive force is substantially 0 (midpoint) so motor efficiency will drop. Also, when voltage is applied during such periods of low energy conversion efficiency, due to eddy current vibration will be produced in directions other than the direction of rotation, thereby creating a noise problem.

As will be understood from the preceding discussion, the advantages of driving a motor by applying voltage of similar waveform to the back electromotive force are that motor efficiency will be improved, and vibration and noise will be reduced.

Figure 4A:
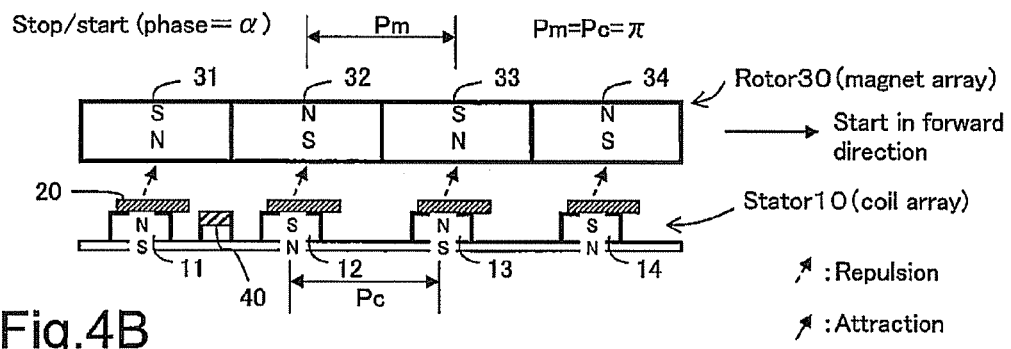
FIGS. 4A to 4E illustrate normal rotation of the motor unit.

FIGS. 4A to 4E illustrate normal rotation of the motor unit 100. FIG. 4A is the same as FIG. 2A, and depicts the positional relationships of the magnets 31-34 and the coils 11-14 at a stop. In the state depicted in FIG. 4A, excitation of the coils 11-14 produces forces of repulsion between the coils 11-14 and the magnets 31-34, in the direction indicated by the broken arrows. As a result, the rotor portion 30 begins to move in the direction of normal rotation (rightward in the drawing).

Figure 4B:
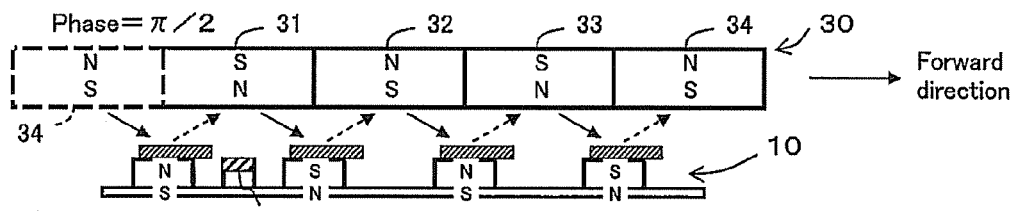
Figure 4C:
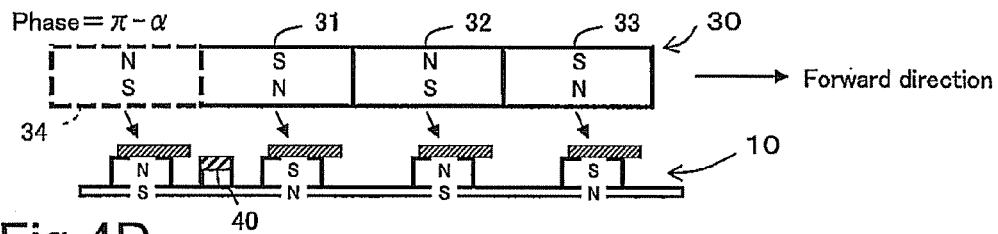
Figure 4D:
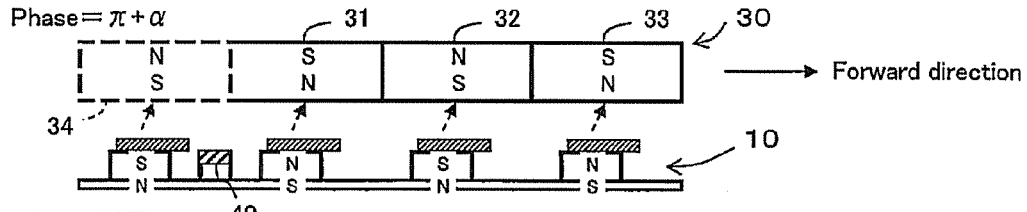
Figure 4E:
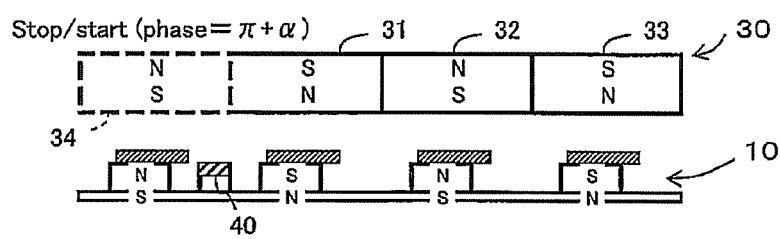

FIG. 4B depicts a state in which the phase has advanced to $\pi/2$. In this state, both forces of attraction (the solid arrows) and forces of repulsion (the broken arrows) are generated, causing strong driving force. FIG. 4C depicts a state in which the phase has advanced to $(\pi-\alpha)$. The coil excitation direction reverses coincident with the timing of the phase going to $\pi$, resulting in the state shown in FIG. 4D. If the motor stops in proximity to the state shown in FIG. 4D, the rotor portion 30 will come to stop at a position like that state shown in FIG. 4E, with the magnetic yokes 20 attracted towards the magnets 31-34. This position is the $(\pi+\alpha)$ phase position. Thus, it will be understood that the motor of the present embodiment will come to a stop at a phase position of $\alpha\pm n\pi$ where n is an integer.

Figure 5A:
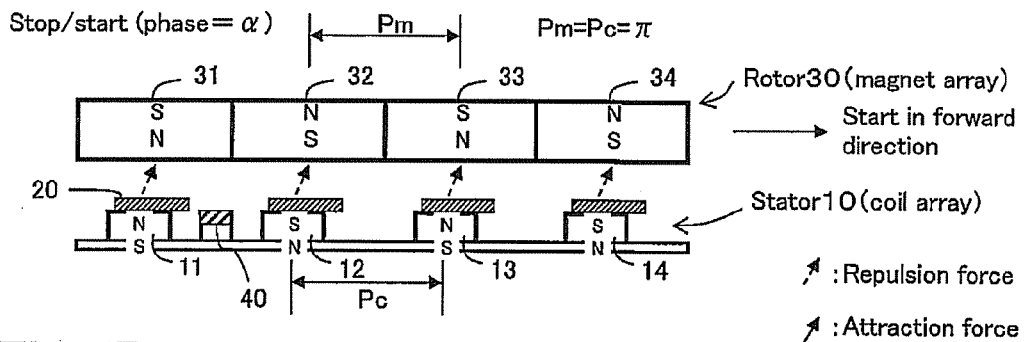
FIGS. 5A to 5E illustrate reverse rotation of the motor unit.

FIGS. 5A to 5E illustrate reverse rotation of the motor unit 100. FIG. 5A is the same as FIG. 4A, and depicts the motor at a stop. When the coils 11-14 are excited in the opposite direction from FIG. 4A for the purpose of reverse rotation from a stop, forces of attraction (not shown) act between the magnets 31-34 and the coils 11-14. These forces of attraction urge the rotor portion 30 to move in the direction of reverse rotation. However, since the forces of attraction are fairly weak, in some instances they will be overcome by the forces of attraction between the magnets 31-34 and the magnetic yokes 20, and reverse rotation of the rotor portion 30 will not be possible.

Figure 5B:
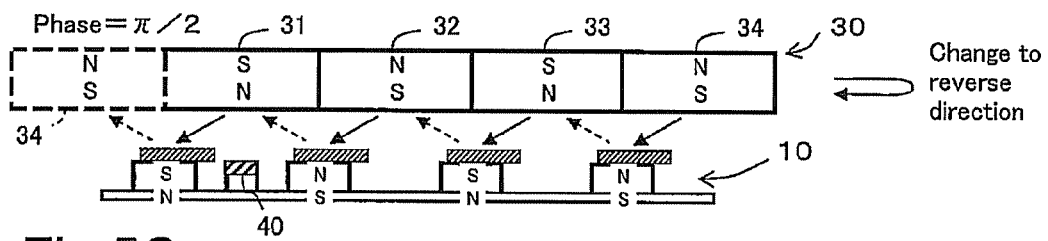
Figure 5C:
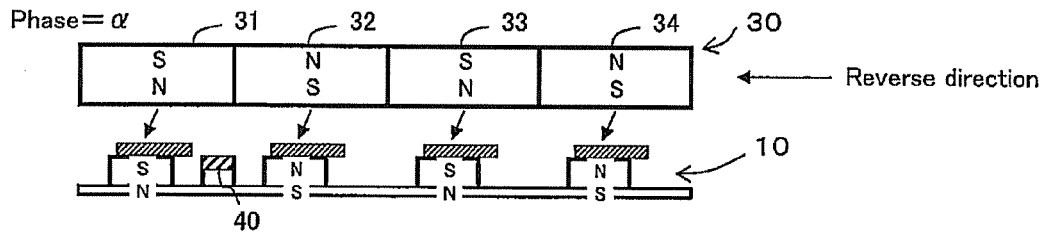
Figure 5D:
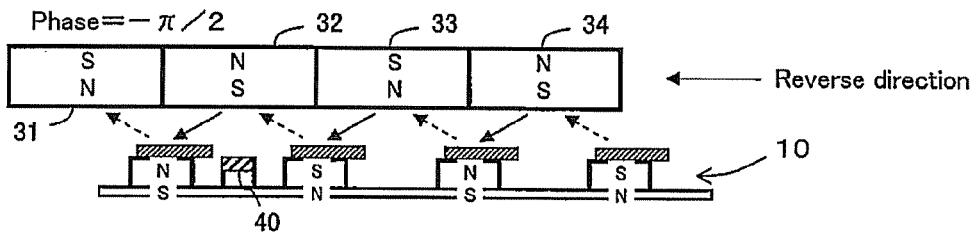
Figure 5E:
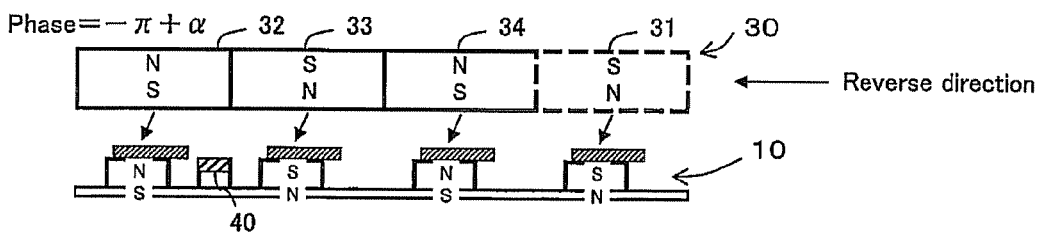

Accordingly, in the present embodiment, even where the motor is to be operated in reverse, at startup the rotor portion 30 will be initially operated in the normal rotation direction as shown in FIG. 5A. Then, once the rotor portion 30 has rotated by a prescribed amount (e.g. when the phase has advanced by about $\pi/2$), the driving signal will reversed and reverse operation initiated as shown in FIG. 5B. Once the rotor portion 30 begins to rotate in reverse in this way, the rotor portion 30 will be able to pass the initial stop position (phase=$\alpha$) due to inertia (FIG. 5C). Subsequently, the coil excitation direction reverses coincident with the timing of the phase going to 0. FIG. 5D depicts the $-\pi/2$ phase state, and FIG. 5E depicts the $-\pi+\alpha$ phase state. If the motor is stopped in proximity to the state of FIG. 5E, the rotor portion 30 will come to a stop at a position of phase=$-\pi+\alpha$ with the magnetic yokes 20 attracted by the magnets 31-34.

FIG. 6 is a flowchart illustrating the control process of the direction of movement of the motor. This process is executed by a drive control circuit, to be discussed later. First, in Step S10, drive control in the forward direction is initiated. In Step S20, it is determined whether the intended direction of movement is the forward direction. The direction of movement will have been input to the drive control circuit by a human operator prior to Step S10. In the event that the intended direction of movement is the forward direction, drive control in the forward direction will continue on as-is. If on the other hand the intended direction of movement is the reverse direction, in Step S30, the circuit will wait for the prescribed timing of reverse rotation. Once the prescribed timing of reverse rotation is reached, in Step S40, drive control in the reverse direction is initiated.

In this way, with the motor of the present embodiment, the motor will come to a stop at a phase position of $\alpha\pm n\pi$ where $\alpha$ is a prescribed value other than zero or $n\pi$, and n is an integer, and thus deadlock points will be avoided. Accordingly, startup will always be possible without the need for a startup coil. Moreover, with the motor of the embodiment, it is possible to accomplish reverse operation by initiating the motor movement with normal rotation for a prescribed small duration from a stop and subsequently changing to reverse rotation.

A2. Configuration of Drive Control Circuit

Figure 7:
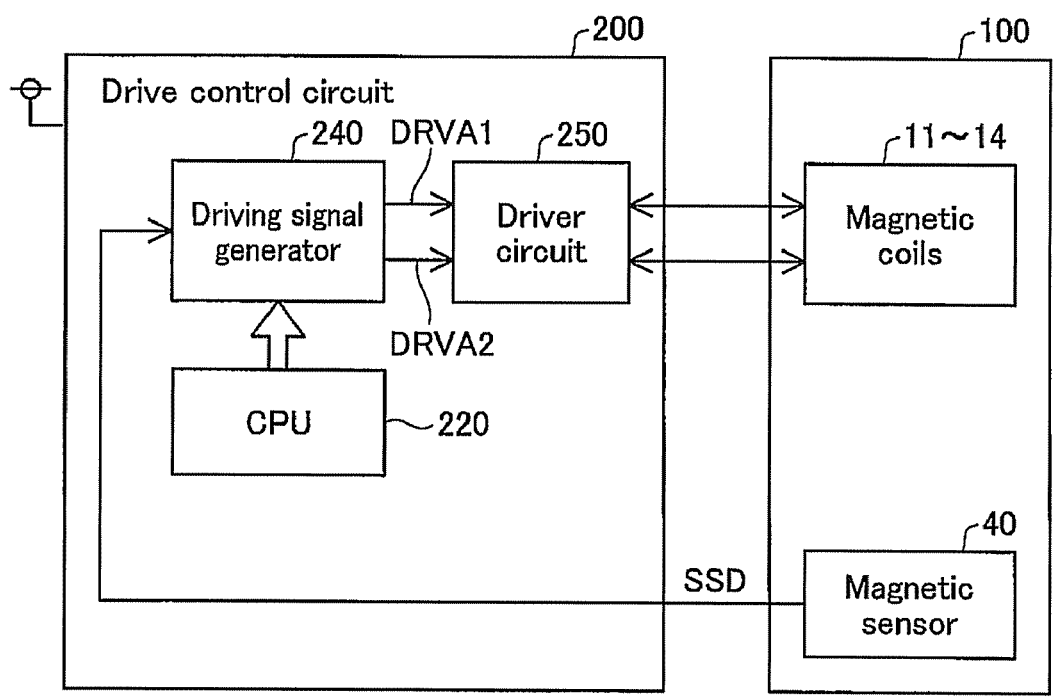
FIG. 7 is a block diagram depicting a configuration of a drive control circuit of the brushless motor of the first embodiment.

FIG. 7 is a block diagram depicting a configuration of a drive control circuit of the brushless motor of the present embodiment. The drive control circuit 200 has a CPU 220, a driving signal generator 240, and a driver circuit 250. The driving signal generator 240 generates a single-phase driving signal DRVA1, DRVA2 on the basis of the output signal SSD of the magnetic sensor 40 in the motor unit 100. The driver circuit 250 drives the magnetic coils 11-14 in the motor unit 100, in accordance with the single-phase driving signal DRVA1, DRVA2.

Figure 8:
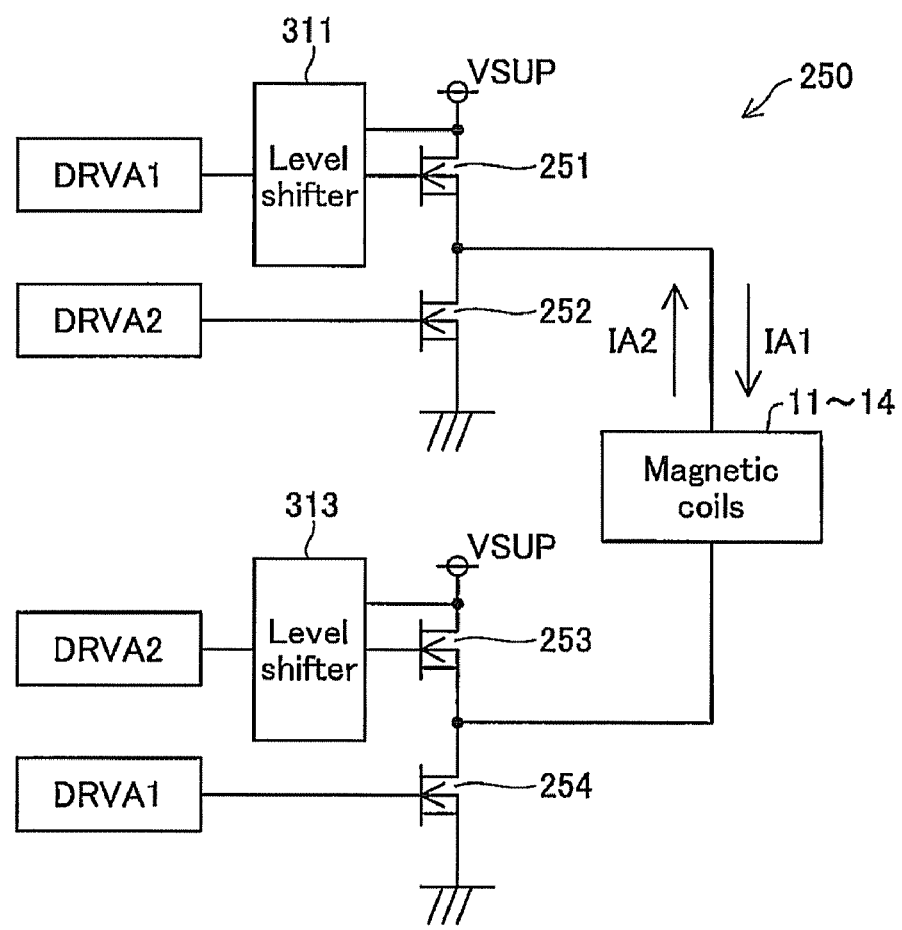
FIG. 8 depicts the internal configuration of the driver circuit.

FIG. 8 depicts the internal configuration of the driver circuit 250. This driver circuit 250 has four transistors 251 through 254 which make up an H bridge circuit. Level shifters 311, 313 are disposed in front of the gate electrodes of the upper arm transistors 251, 253. However, the level shifters may be omitted. The transistors 251 through 254 of the driver circuit 250 go on and off depending on driving signals DRVA1, DRVA2 which function as switching signals, as a result of which supply voltage VSUP is supplied intermittently to the magnet coils 11 through 14. The arrows labeled IA1 and IA2 respectively indicate the direction of current flow with the driving signals DRVA1, DRVA2 at H level. It is possible to employ circuits of various other configuration composed of multiple switching elements as the driver circuit.

Figure 9A:
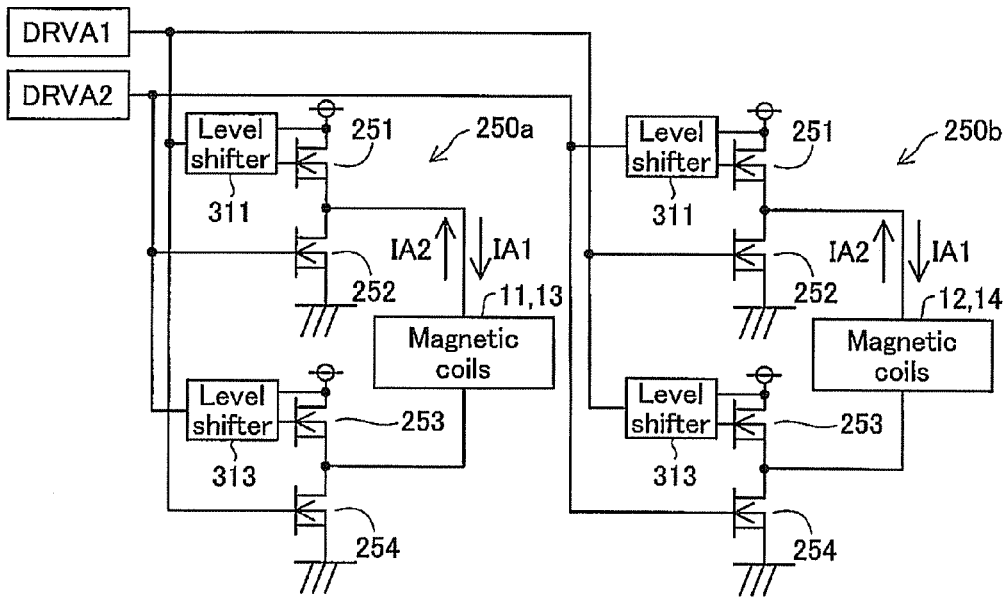
FIGS. 9A to 9C are illustrations of another configuration and operation of a driver circuit.
Figure 9B:
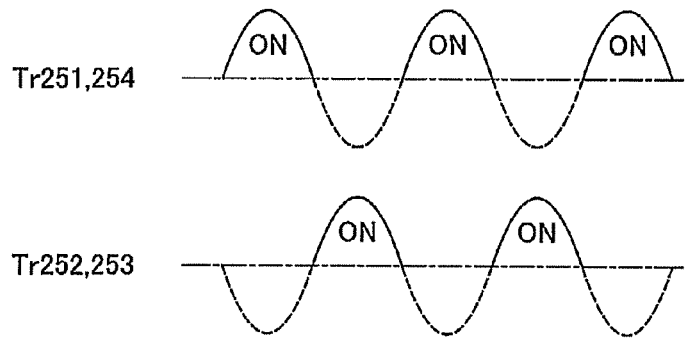
Figure 9C:
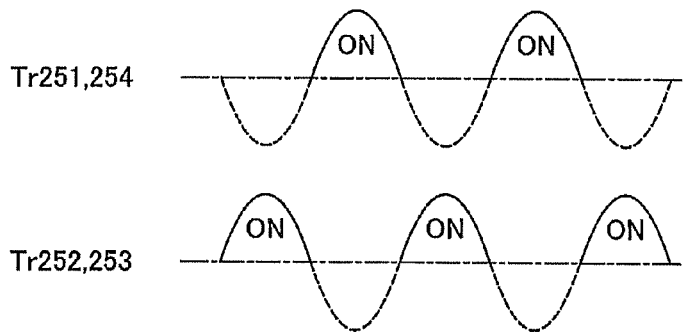
Figure 10A:
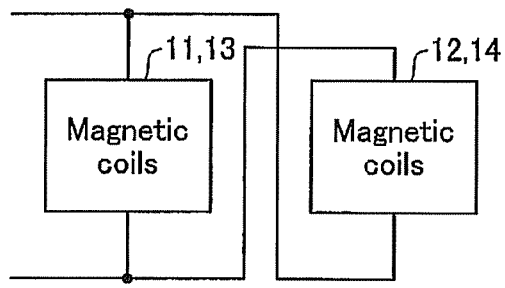
FIGS. 10A to 10D are illustrations of various winding configurations for the magnetic coils.
Figure 10B:
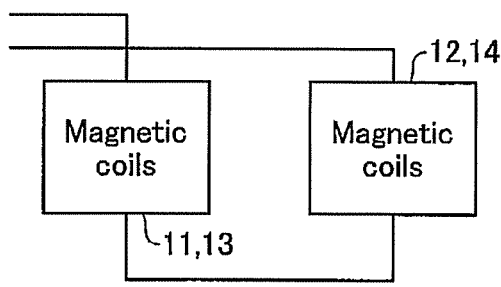
Figure 10C:
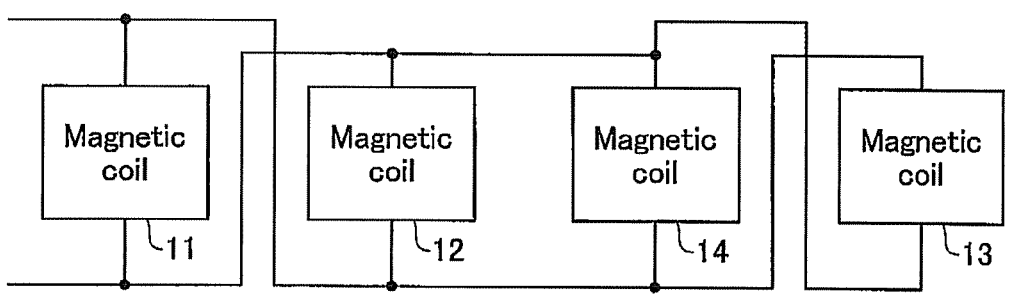
Figure 10D:
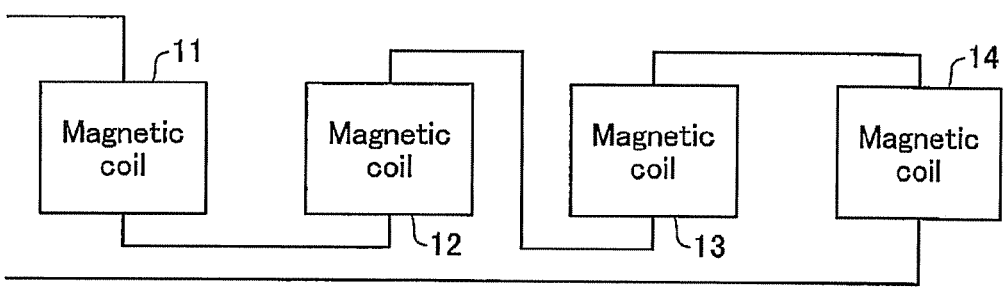

FIGS. 9A to 9C are illustrations of another configuration and operation of a driver circuit. This driver circuit is composed of a first bridge circuit 250a for use with a first set of magnet coils 11, 13; and a second bridge circuit 250b for use with a second set of magnet coils 12, 14. Each of the bridge circuits 250a, 250b is composed of four transistors 251 through 254, the configuration thereof being identical to that shown in FIG. 8. Level shifters 311, 313 are disposed in front of the gate electrodes of the upper arm transistors 251, 253. However, the level shifters may be omitted. In the first bridge circuit 250a, the first driving signal DRVA1 is supplied to the transistors 251, 254, while the second driving signal DRVA2 is supplied to the other transistors 252, 253. On the other hand, in the second bridge circuit 250b, conversely, the first driving signal DRVA1 is supplied to the transistors 252, 253, while the second driving signal DRVA2 is supplied to the other transistors 251, 254. As a result, operations of the first bridge circuit 250a and the second bridge circuit 250b is the reverse of one another as shown in FIG. 9B and FIG. 9C. Consequently, the first set of magnet coils 11, 13 driven by the first bridge circuit 250a and the second set of magnet coils 12, 14 driven by the second bridge circuit 250b are phase shifted by $\pi$ with respect to each other. Meanwhile, in the circuit shown in FIG. 8, the winding configuration of the first coils 11, 13 is the reverse of the winding configuration of the second coils 12, 14, and the two sets are phase shifted by $\pi$ through this winding configuration. In this way, both the driver circuit of FIG. 8 and the driver circuit of FIG. 9A have the identical feature that two sets of coils are phase shifted by $\pi$ with respect to each other; and both afford a single-phase motor.

FIGS. 10A to 10D are illustrations of various winding configurations for the magnetic coils 11-14. By engineering the winding configuration as in these examples, it is possible for adjacent coils to always be excited in opposite directions.

Figure 11:
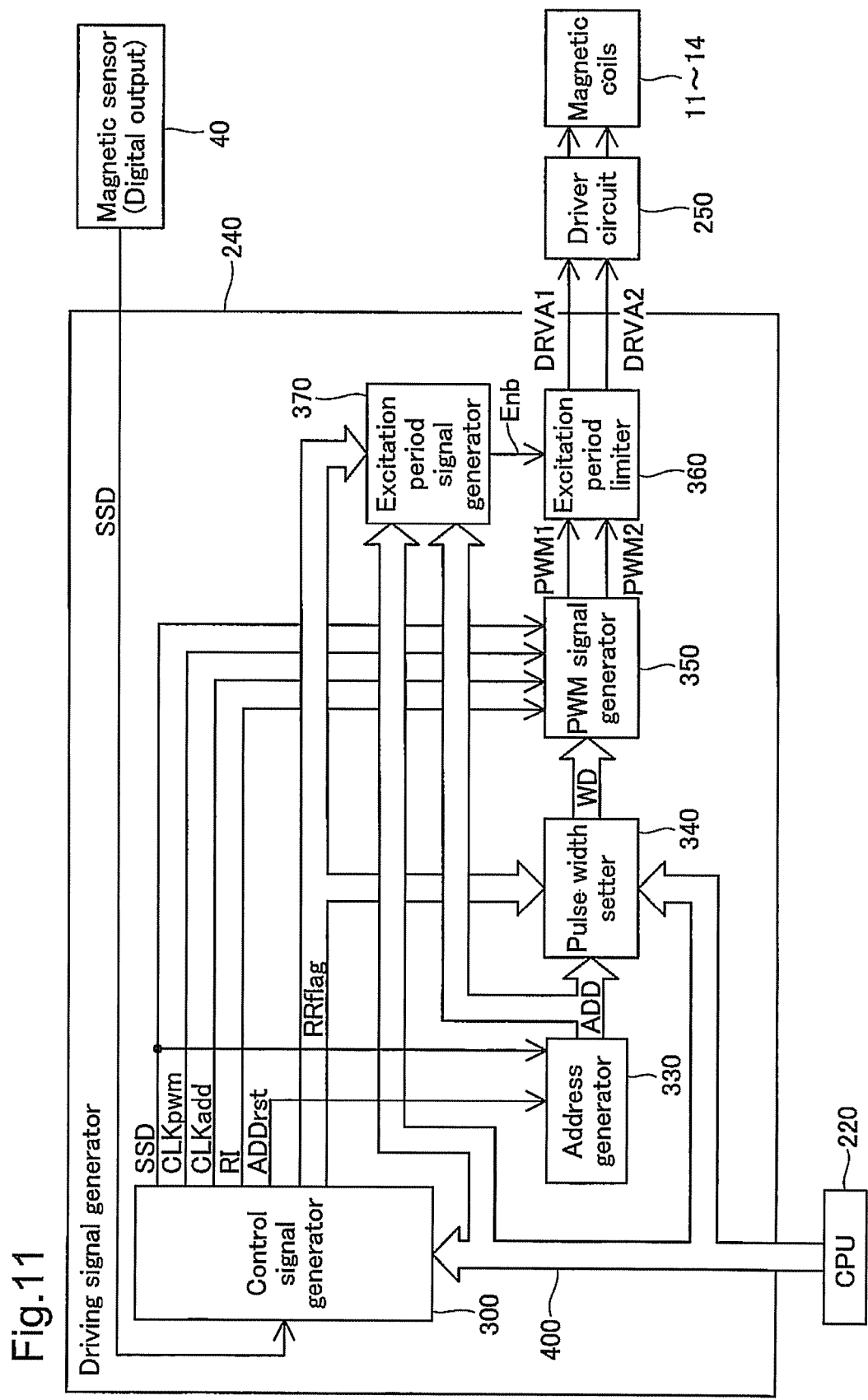
FIG. 11 shows the internal structure of the driving signal generator.

FIG. 11 shows the internal structure of the driving signal generator 240 (see FIG. 7). The driving signal generator 240 has a control signal generator 300, an address generator 330, a pulse width setter 340, a PWM signal generator 350, an excitation period limiter 360, and an excitation period signal generator 370. The control signal generator 300, the pulse width setter 340, and the excitation period signal generator 370 are connected with the CPU 220 via a bus 400. The control signal generator 300 inputs the sensor output (also called sensor signal) SSD from the magnetic sensor 40, and outputs a PWM clock signal CLKpwm, an address clock signal CLKadd, a forward reverse direction command signal R1, an address reset signal ADDrst, and a speed signal RRflag. The control signal generator 300 also directly outputs the input sensor signal SSD. The address generator 330 inputs the address reset signal ADDrst and the address clock signal CLKadd, and outputs an address value ADD. The pulse width setter 340 sets a pulse width WD corresponding to the input address value ADD. The PWM signal generator 530 inputs the sensor signal SSD, the PWM clock signal CLKpwm, the address clock signal CLKadd, the forward reverse direction command signal RI, and the pulse width WD, and outputs first and second PWM signals PWM1 and PWM2. The excitation period limiter 360 generates first and second driving signals DRVA1 and DRVA2 based on the input first and second PWM signals PWM1 and PWM2 and an excitation period signal Enb generated by the excitation period signal generator 370. The excitation period signal generator 370 generates the excitation period signal Enb based on the speed signal RRflag and the address value ADD. The functions of these components in the driving signal generator 240 are discussed in detail.

Figure 12A:
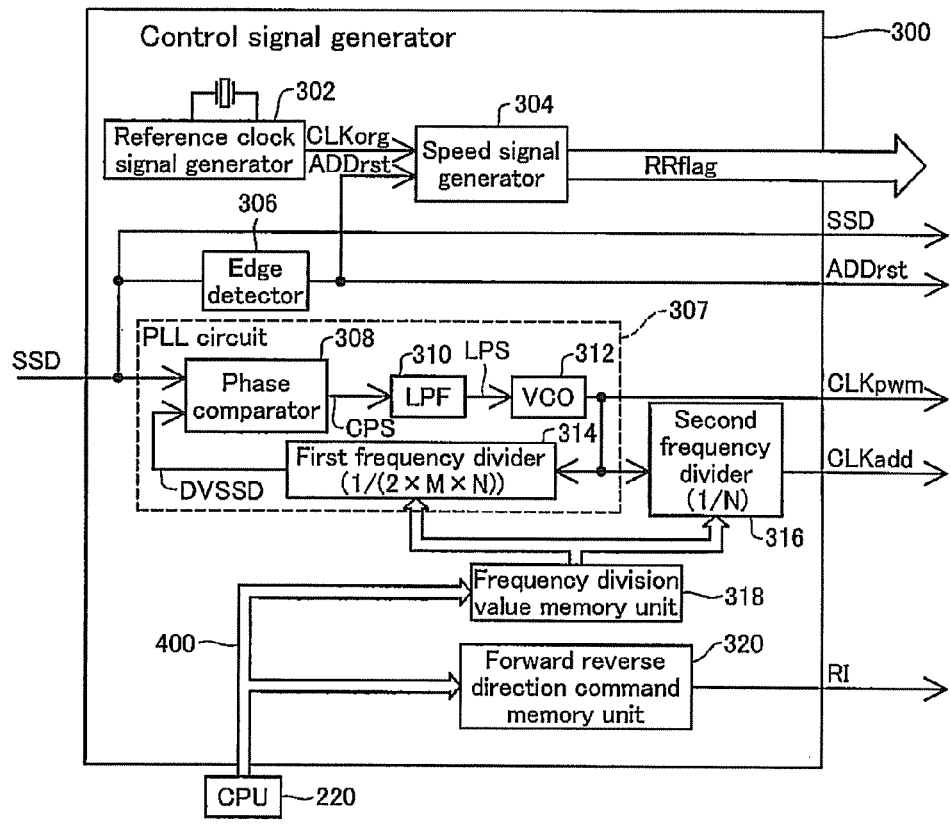
FIG. 12A is a block diagram showing the internal structure of the control signal generator.
Figure 12B:
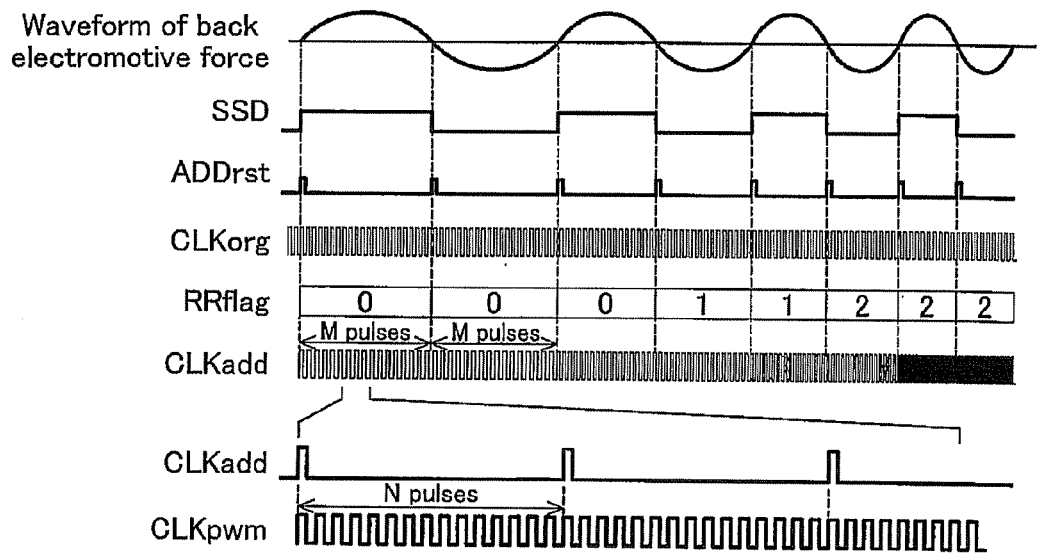
FIG. 12B is a timing chart showing changes of the respective signals.

FIG. 12A is a block diagram showing the internal structure of the control signal generator 300. FIG. 12B is a timing chart showing changes of the respective signals. The control signal generator 300 includes a reference clock signal generator 302, a speed signal generator 304, an edge detector 306, a PLL circuit 307, a second frequency divider 316, a frequency division value memory unit 318, and a forward reverse direction command memory unit 320. The reference clock signal generator 302 generates a reference clock signal CLKorg having a fixed frequency. The reference clock signal CLKorg is supplied to the speed signal generator 304. The sensor signal SSD is supplied to the edge detector 306 and the PLL circuit 307. The edge detector 306 detects a rising edge and a falling edge of the sensor signal SSD and generates the address reset signal ADDrst having pulses corresponding to detection of these edges. The address reset signal ADDrst is supplied to the speed signal generator 304 and the address generator 330 (FIG. 11). The speed signal generator 304 counts the number of pulses of the reference clock signal CLKorg generated between two pulses of the address reset signal ADDrst and generates the speed signal RRflag representing a rotation speed of the motor based on the result of pulse counting. The rotation speed of the motor decreases with an increase in number of pulses of the reference clock signal CLKorg counted between the two pulses of the address reset signal ADDrst and increases with a decrease in counted number of pulses of the reference clock signal CLKorg. In the circuit structure of this embodiment, the speed signal generator 304 sets threshold values for the counted number of pulses to change the value of the speed signal RRflag in four different stages from 0 to 3 according to the counted number of pulses of the reference clock signal CLKorg. The rotation speed represented by the speed signal RRflag increases with an increase in value of the speed signal RRFlag from RRflag=0 to RRflag=3.

The PLL circuit 307 includes a phase comparator 308, a loop filter (LPF) 310, a voltage control oscillator (VCO) 312, and a first frequency divider 314. The first frequency divider 314 uses a frequency division value (2×M×N) stored in the frequency division value memory unit 318 to divide the frequency of the input PWM clock signal CLKpwm. The sensor signal SSD is input into the phase comparator 308. A frequency division signal DVSSD generated by the first frequency divider 314 is input as a comparison signal into the phase comparator 308. The phase comparator 308 generates an error signal CPS representing a phase difference between the two input signals SSD and DVSSD. The error signal CPS is supplied to the loop filter 310 having an internal charge pump circuit. The loop filter 310 generates and outputs a voltage control signal LPS having a voltage level corresponding to the pulse level and the number of pulses of the error signal CPS.

The voltage control signal LPS is supplied to the voltage control oscillator 312. The voltage control oscillator 312 outputs the PWM clock signal CLKpwm having a frequency corresponding to the voltage level of the voltage control signal LPS. The frequency divider 314 generates the frequency division signal DVSSD by frequency division of the PWM clock signal CLKpwm to 1/(2×M×N). The frequency division signal DVSSD is input into the phase comparator 308 for the phase comparison with the sensor signal SSD as mentioned above. The frequency of the PWM clock signal CLKpwm is converged to reduce the phase difference between the two signals SSD and DVSSD to 0. A frequency fCLKpwm of the PWM clock signal CLKpwm after the convergence has the following relation to a frequency fSDD of the sensor signal SSD as expressed by Equation (1):

$$fCLKpwm = fSSD \times (2 \times M \times N) \qquad (1)$$

The PWM clock signal CLKpwm is supplied to the second frequency divider 316 and the PWM signal generator 350 (FIG. 11). The second frequency divider 316 uses a frequency division value N stored in the frequency division value memory unit 318 to divide the frequency of the input PWM clock signal CLKpwm and generates the address clock signal CLKadd. A frequency fCLKadd of the address clock signal CLKadd has the following relation to the frequency fCLKpwm of the PWM clock signal CLKpwm as expressed by Equation (2):

$$fCLKadd = fCLKpwm/N \quad (2)$$

According to Equations (1) and (2) given above, there are the following relations between the frequency fSSD of the sensor signal SSD, the frequency fCLKadd of the address clock signal CLKadd, and the frequency fCLKpwm of the PWM clock signal CLKpwm as expressed by Equations (3) and (4):

$$fCLKadd = fSSD \times 2 \times M \quad (3)$$

$$fCLKpwm = fCLKadd \times N \quad (4)$$

As shown in FIG. 12B, the address clock signal CLKadd generates M pulses in each of a high level period and a low level period of the sensor signal SSD. The PWM clock signal CLKpwm generates N pulses in one cycle of the address clock signal CLKadd.

The frequency division values M and N may be rewritten to any arbitrary values by the CPU 220. The forward reverse direction command memory unit 320 stores the forward reverse direction command signal RI representing a rotating direction of the motor specified by the CPU 220. The forward reverse direction command signal RI has a low level for forward rotation of the motor and a high level for reverse rotation of the motor.

Figure 13A:
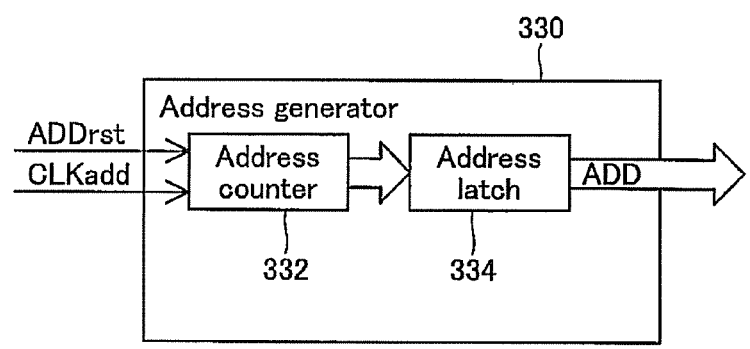
FIG. 13A is a block diagram showing the internal structure of the address generator.
Figure 13B:
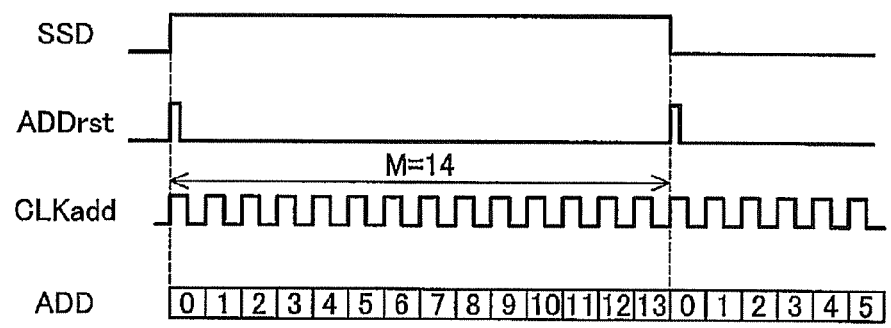
FIG. 13B is a timing chart showing changes of the respective signals.

FIG. 13A is a block diagram showing the internal structure of the address generator 330. FIG. 13B is a timing chart showing changes of the respective signals. The respective signals in the illustrated example of FIG. 13B are based on the assumption of the frequency division values M=14 and N=16. The address generator 330 includes an address counter 332 and an address latch 334. The address counter 332 counts the number of pulses of the address clock signal CLKadd and resets the count value in response to a rising edge of the address reset signal ADDrst. The address latch 334 stores the count value by the address counter 332 and outputs the stored count value as the address value ADD. As shown in FIG. 13B, numbers of 0 to 13 are circularly generated as the address value ADD.

Figure 14A:
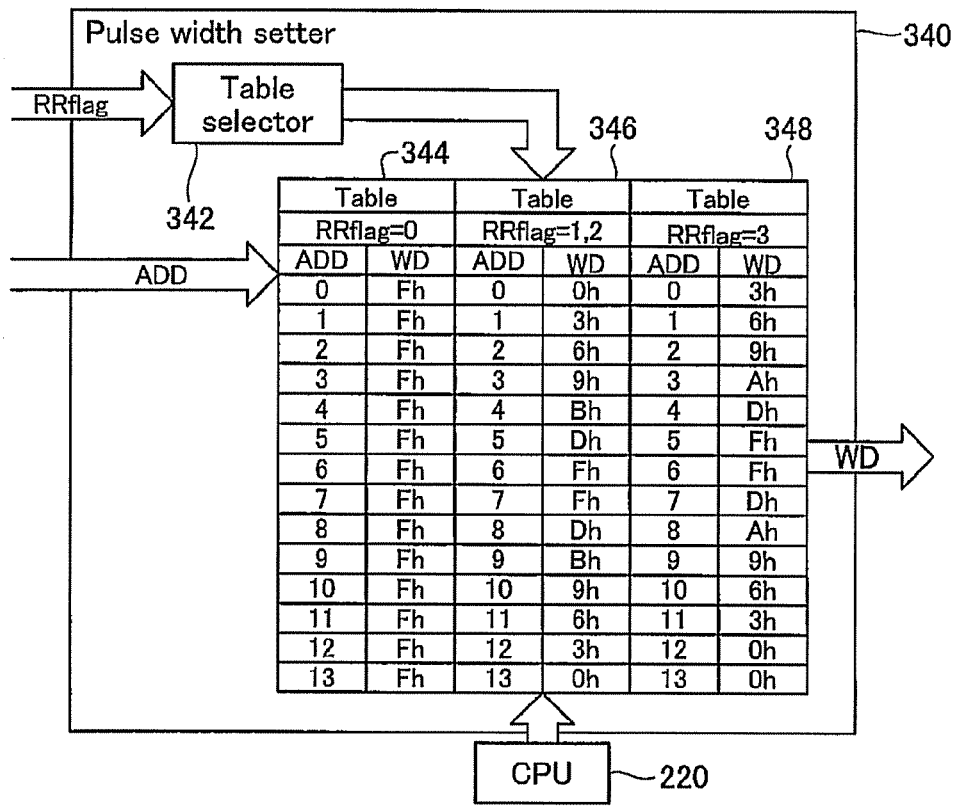
FIG. 14A is a block diagram showing the internal structure of the pulse width setter.
Figure 14B:
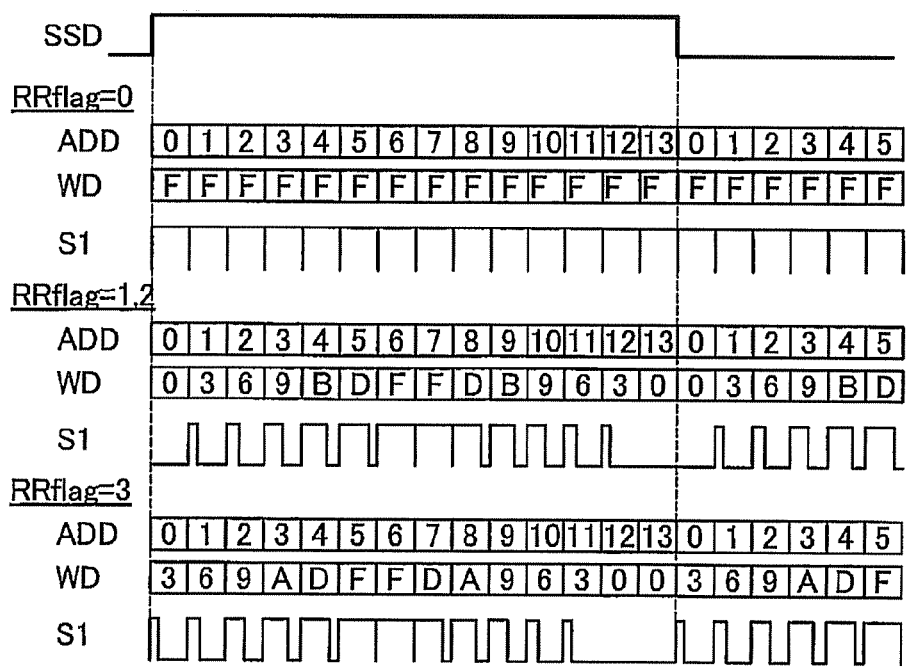
FIG. 14B is a timing chart showing changes of the respective signals.

FIG. 14A is a block diagram showing the internal structure of the pulse width setter 340. FIG. 14B is a timing chart showing changes of the respective signals. A signal S1 shown in FIG. 14B is generated by a down counter 352 (see FIG. 15) explained later to have pulses corresponding to the settings of the pulse width WD. The pulse width setter 340 has a table selector 342 and three tables 344, 346, and 348. The table selector 342 refers to the speed signal RRflag and selects one of the three tables 344, 346, and 348 according to the value of the speed signal RRflag. For example, the table 346 is selected in response to the speed signal RRflag=1. The three tables 344, 346, and 348 store the settings of the pulse width WD to be output corresponding to the varying address value ADD. The selected table outputs the pulse width WD corresponding to the input address value ADD.

In response to the speed signal RRflag=0 representing a low rotation speed of the motor, the first table 344 is selected. In the specification hereof, a value 'Xh' represents a hexadecimal number. The selected first table 344 continually outputs the pulse width WD set to a maximum value Fh. Setting the pulse width WD to the maximum value Fh enables a large driving force to be produced, for example, at a start of the motor and in a low rotation speed range.

In response to the speed signal RRflag=1 or 2 representing an increased rotation speed of the motor, the second table 346 is selected. The table 346 sets the pulse width WD to the maximum value Fh at a certain timing of the address value ADD corresponding to the pulse center of the sensor signal SSD. The pulse width WD is set to decrease with an increase in temporal distance of the address value ADD from the timing corresponding to the pulse center of the sensor signal SSD. Setting the pulse width WD in this manner generates a PWM signal simulating the waveform of the back electromotive force and enables the motor to be driven with high efficiency. Whether the speed signal RRflag is equal to 1 or 2, the same value is set to the pulse width WD output from the pulse width setter 340. Different values are, however, set to an excitation period at the speed signal RRflag=1 and at the speed signal RRflag=2 as discussed later. The maximum value of the pulse width WD is not restricted to the value Fh but may be a preset maximum value corresponding to the frequency division value N or may be any arbitrarily set maximum value.

In response to the speed signal RRflag=3 representing a further increased rotation speed of the motor, the third table 348 is selected. The table 348 sets the pulse width WD to the maximum value Fh at an earlier timing of the address value ADD than the timing corresponding to the pulse center of the sensor signal SSD. This enables advance control of slightly advancing the phase of a driving signal DRVA. The advance control does not have a significant effect at the low rotation speed of the motor but significantly improves the efficiency at the high rotation speed of the motor.

The settings of the pulse width WD stored in the three tables 344, 346, and 348 may be rewritten to any arbitrary values by the CPU 220. The PWM signal generator 350 (FIG. 11) can thus generate the PWM signals PWM1 and PWM2 having the arbitrary pulse widths WD.

Figure 15:
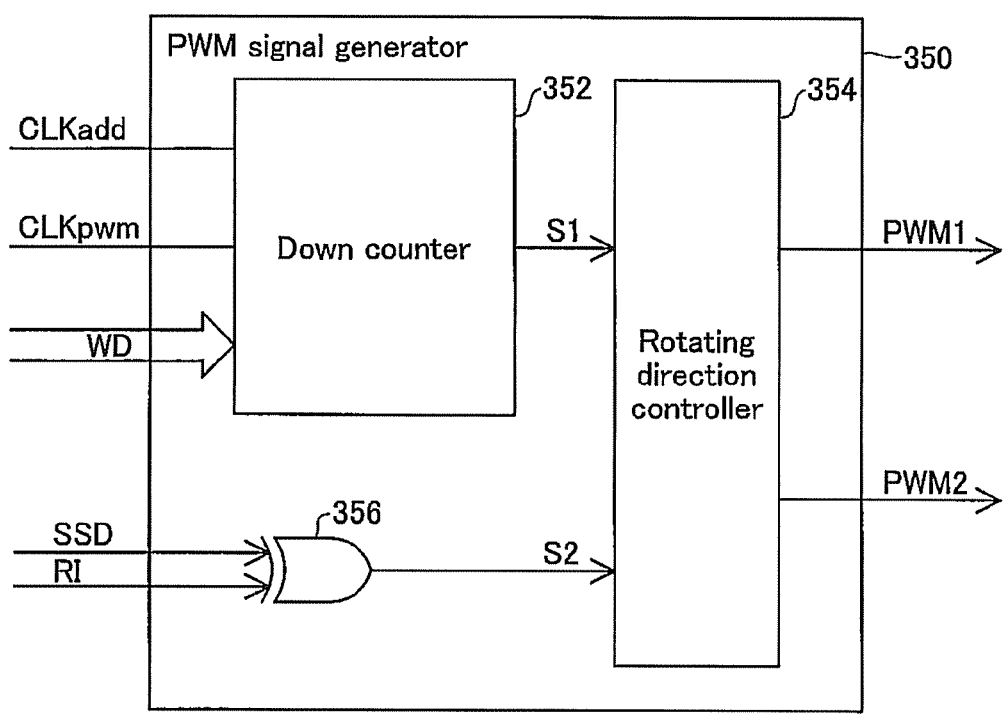
FIG. 15 is a block diagram showing the internal structure of the PWM signal generator.

FIG. 15 is a block diagram showing the internal structure of the PWM signal generator 350. The PWM signal generator 350 includes the down counter 352, a rotating direction controller 354, and an EXOR circuit 356, which have functions as described below.

Figure 16:
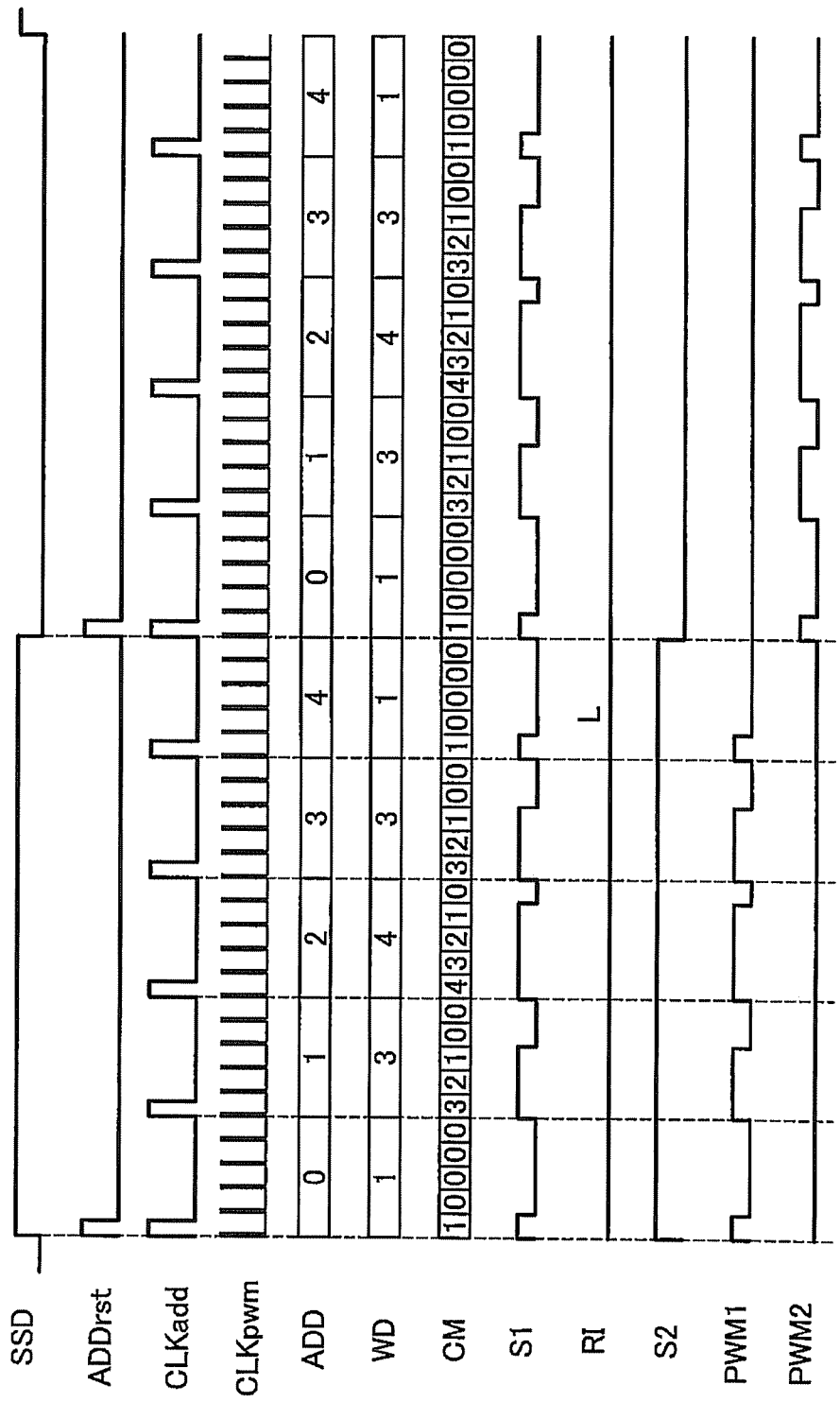
FIG. 16 is a timing chart showing changes of the respective signals during forward rotation of the motor.

FIG. 16 is a timing chart showing changes of the respective signals during forward rotation of the motor. The signals shown in FIG. 16 include the sensor signal SSD, the address reset signal ADDrst, the two clock signals CLKadd and CLKpwm, the address value ADD, the pulse width WD, a count value CM on the down counter 352, the output S1 of the down counter 352, the forward reverse direction command signal RI, an output S2 of the EXOR circuit 356, and the output signals PWM1 and PWM2 of the rotating direction controller 354. The respective signals in the illustrated example of FIG. 16 are based on the assumption of the frequency division values M=5 and N=5. The down counter 352 (FIG. 15) repeats an operation of counting down the count value CM to 0 in synchronism with the PWM clock signal CLKpwm at each cycle of the address clock signal CLKadd. The count value CM is initially set to the value of the pulse width WD. The output S1 of the down counter 352 is set to a high level against the count value CM not equal to 0 and falls to a low level against the count value CM equal to 0.

The EXOR circuit 356 outputs the signal S2 representing an exclusive OR of the sensor signal SSD and the forward reverse direction command signal RI. During forward rotation of the motor, the forward reverse direction command signal RI is set to a low level. The output S2 of the EXOR circuit 356 is accordingly identical with the sensor signal SSD. The rotating direction controller 354 inputs the output S1 of the down counter 352 and the output S2 of the EXOR circuit 356 and generates the PWM signals PWM1 and PWM2. The output S1 of the down counter 352 is output as the first PWM signal PWM1 at a high level of the output S2 of the EXOR circuit 356 and is output as the second PWM signal PWM2 at a low level of the output S2.

Figure 17:
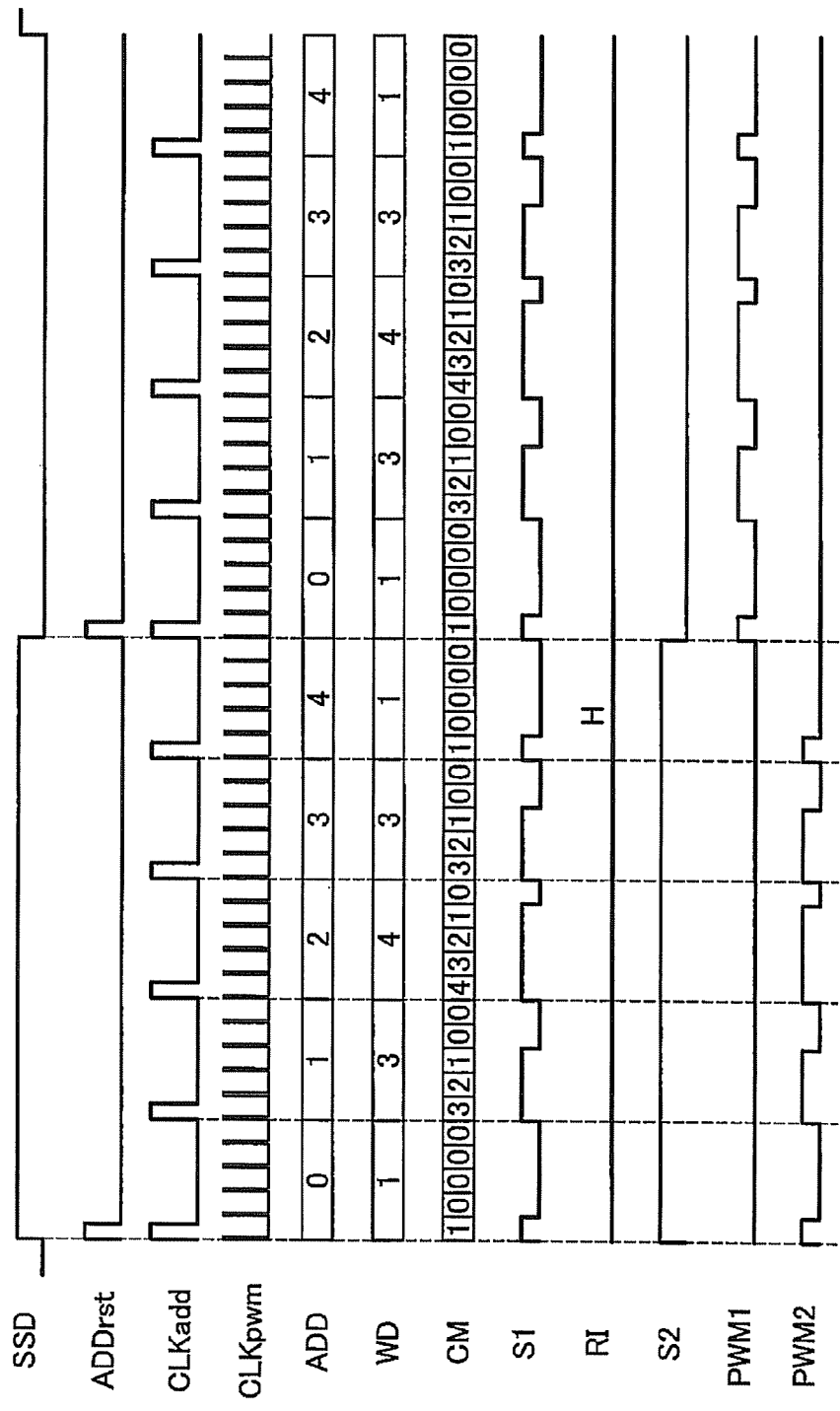
FIG. 17 is a timing chart showing changes of the respective signals during reverse rotation of the motor.

FIG. 17 is a timing chart showing changes of the respective signals during reverse rotation of the motor. During reverse rotation of the motor, the forward reverse direction command signal RI is set to a high level. This level change of the forward reverse direction command signal RI leads to the opposed outputs of the PWM signals PWM1 and PWM2 in the timing chart of FIG. 17 from those in the timing chart of FIG. 16. This clearly proves the reverse rotation of the motor.

Figure 18A:
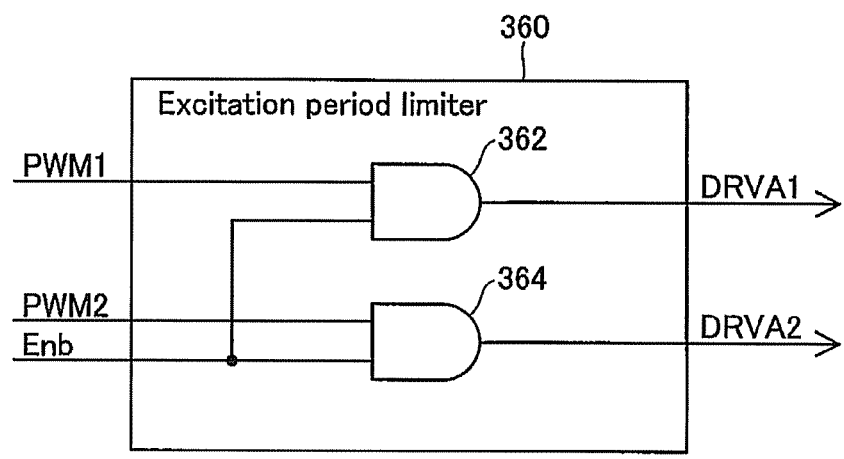
FIG. 18A is a block diagram showing the internal structure of the excitation period limiter.
Figure 18B:
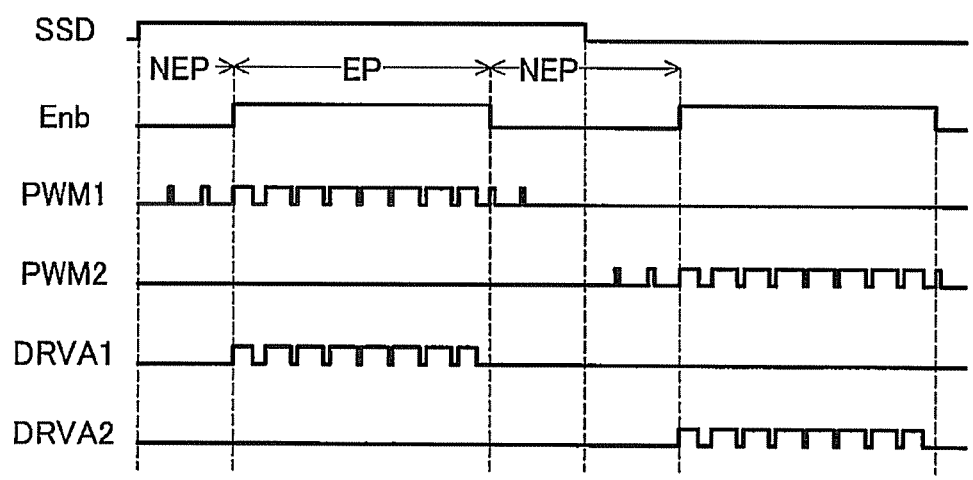
FIG. 18B is a timing chart showing changes of the respective signals.

FIG. 18A is a block diagram showing the internal structure of the excitation period limiter 360. FIG. 18B is a timing chart showing changes of the respective signals. The excitation period limiter 360 has two AND circuits 362 and 364. The excitation period signal Enb is generated by the excitation period signal generator 370 (FIG. 11) and has a high level period set to an excitation period EP and a low level period set to a non-excitation period NEP. In the excitation period EP, the PWM signals PWM1 and PWM2 are enabled as the driving signals DRVA1 and DRVA2. In the non-excitation period NEP, on the other hand, the PWM signals PWM1 and PWM2 are disabled as the driving signals DRVA1 and DRVA2. The first AND circuit 362 outputs the driving signal DRVA1 representing a logical AND of the excitation period signal Enb and the PWM signal PWM1. The second AND circuit 364 outputs the driving signal DRVA2 representing a logical AND of the excitation period signal Enb and the PWM signal PWM2. The procedure of generating the excitation period signal Enb will be described in detail later. In the timing chart of FIG. 18B, the excitation period signal Enb has the low level period set to the non-excitation period NEP corresponding to transition periods of the sensor signal SSD from the high level to the low level and from the low level to the high level. The non-excitation period NEP keeps a high impedance condition with no output of the driving signals DRVA1 and DRVA2.

Figure 19A:
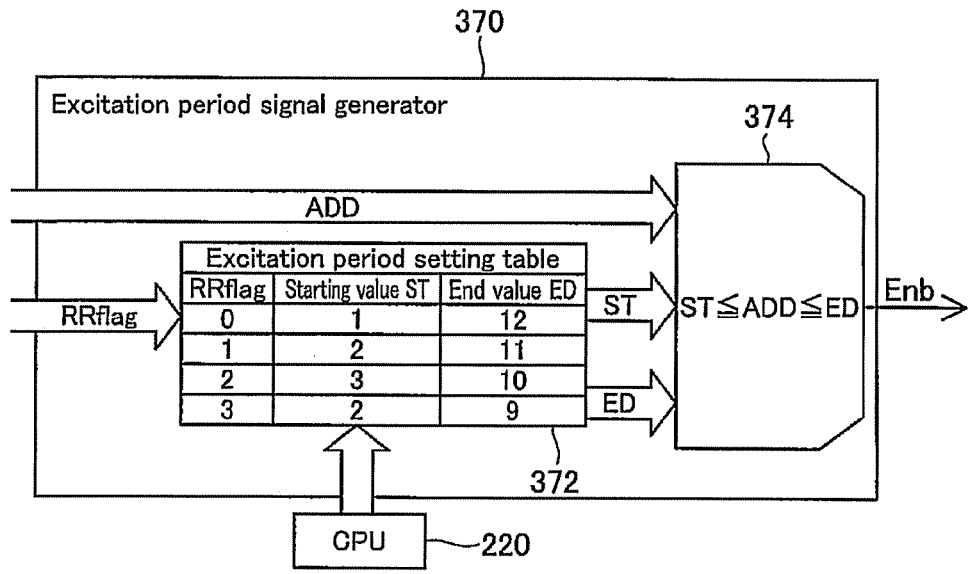
FIG. 19A is a block diagram showing the internal structure of the excitation period signal generator.
Figure 19B:
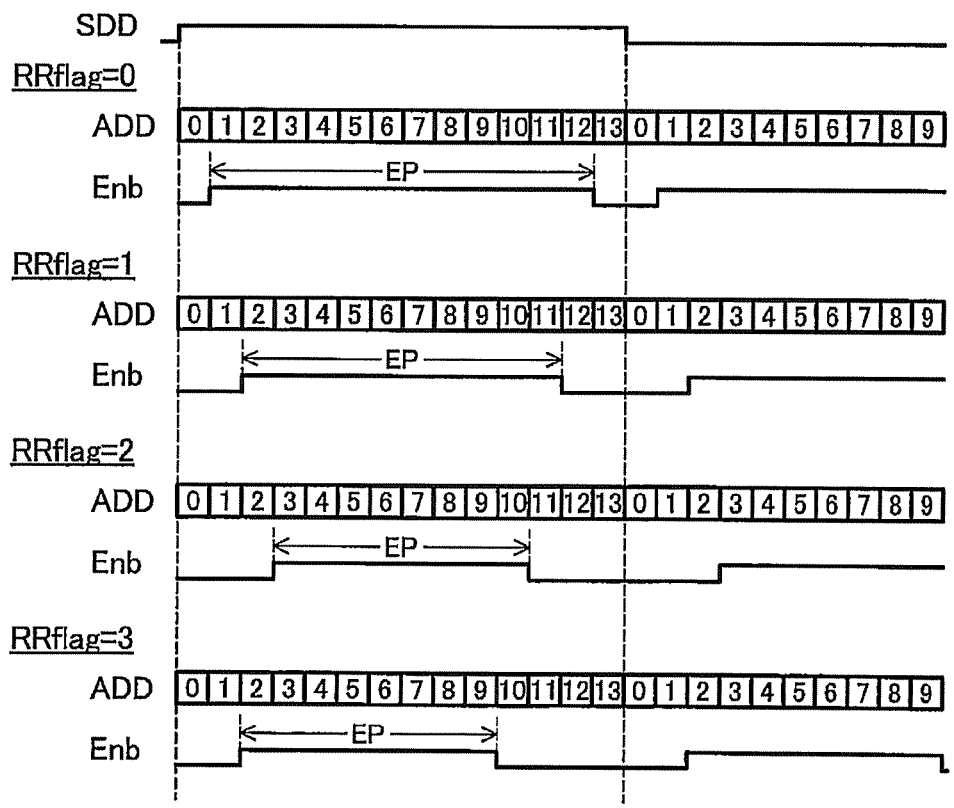
FIG. 19B is a timing chart showing changes of the respective signals.

FIG. 19A is a block diagram showing the internal structure of the excitation period signal generator 370. FIG. 19B is a timing chart showing changes of the respective signals. The excitation period signal generator 370 includes an excitation period setting table 372 and an excitation period signal output unit 374. The excitation period setting table 372 stores the settings of a starting value ST and an end value ED corresponding to each value of the speed signal RRflag. The excitation period signal output unit 374 inputs the starting value ST, the end value ED, and the address value ADD and outputs the excitation period signal Enb set to the high level when the input address value ADD is between the starting value ST and the end value ED.

The starting value ST and the end value ED are set to narrow the width of the excitation period EP with an increase in speed signal RRflag from 0 to 2. Such setting decreases the time of voltage application to the coil with an increase in rotation speed of the motor and thereby reduces the power consumption. Under the advance control at the speed signal RRflag=3 representing a further increased rotation speed of the motor, the starting value ST and the end value ED are preferably set to locate the center of the excitation period EP prior to the center of the sensor signal SSD. The settings of the starting value ST and the end value ED may be rewritten to any arbitrary values by the CPU 220.

As mentioned previously, the excitation period signal generator 370 changes the excitation period EP in four different stages corresponding to the four different values of the speed signal RRflag. The pulse width setter 340, on the other hand, changes the settings of the pulse width WD in three different stages according to the value of the speed signal RRflag. Namely the greater number of tables is used for changing the excitation period EP according to the value of the speed signal RRflag than the number of tables used for changing the settings of the pulse width WD according to the value of the speed signal RRflag. The excitation period EP can thus be changed with regard to the PWM signals PWM1 and PWM2 having identical settings of the pulse width WD.

As described above, in the circuit structure of the first embodiment, the pulse width WD is set corresponding to the address value ADD generated by the address generator 330. The driving signals DRVA1 and DRVA2 for driving the motor are generated by PWM control with the binary digital signal SSD output from the magnetic sensor 40.

The address clock signal CLKadd (FIG. 12) of the embodiment is equivalent to the 'division signal' of the invention. The PLL circuit 307 (FIG. 12A) and the second frequency divider 316 (FIG. 12A) of the embodiment correspond to the 'division signal generator' of the invention. The excitation period limiter 360 (FIG. 18A) and the excitation period signal generator 370 (FIG. 19A) of the embodiment correspond to the 'excitation period setter' of the invention. The address value ADD of the embodiment is equivalent to the 'division signal' of the invention. The address generator 330 of the embodiment is equivalent to the 'division signal generator' of the invention.

B. Second Embodiment

Figures 20A, 20B:
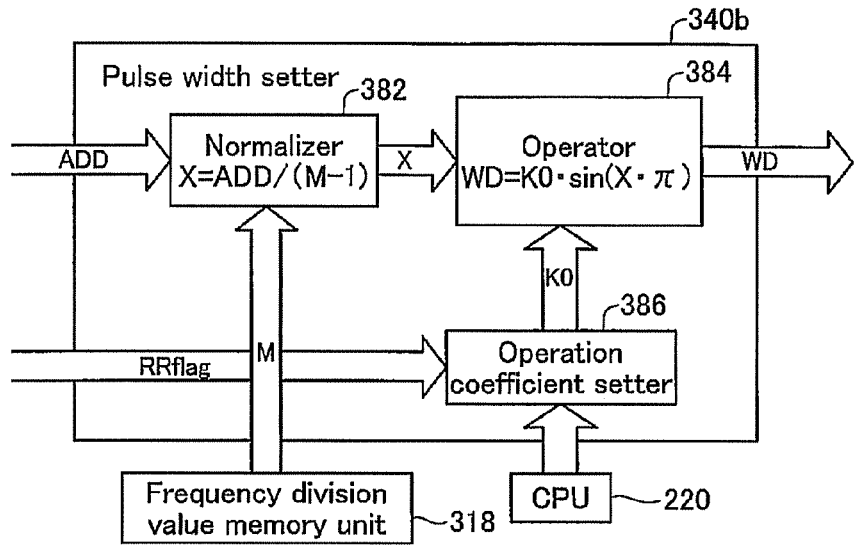
FIG. 20A is a block diagram showing the internal structure of a pulse width setter in a second embodiment.
FIG. 20B is a table showing results of an operation of calculating the pulse width WD from the address value ADD by the pulse width setter.

FIG. 20A is a block diagram showing the internal structure of a pulse width setter 340b in a second embodiment. FIG. 20B is a table showing results of an operation of calculating the pulse width WD from the address value ADD by the pulse width setter 340b. The difference from the first embodiment shown in FIG. 14A is only the procedure of setting the pulse width WD. Otherwise the circuit structure of the second embodiment is the same as the circuit structure of the first embodiment.

The pulse width setter 340b includes a normalizer 382, an operator 384, and an operation coefficient setter 386. The normalizer 382 is connected with the frequency division value memory unit 318. The normalizer 382 normalizes the address value ADD with the frequency division value M to a range of 0 to 1 and determines a normalized value X according to Equation (5) given below:

$$X = \text{ADD}/(M-1) \quad (5)$$

The operation coefficient setter 386 sets a coefficient K0 used for the operation by the operator 384 according to the value of the speed signal RRflag. It is preferable to allow the value of the coefficient K0 stored in the operation coefficient setter 386 to be rewritten to any arbitrary value by the CPU 220. The operator 384 inputs the normalized value X and calculates the pulse width WD according to Equation (6) given below:

$$WD = K0 \times \sin(X \cdot \pi) \quad (6)$$

The table of FIG. 20B shows the results of the operation based on the assumption of the coefficient K0=15. The coefficient K0 is preferably set to be not greater than the frequency division value N. Even when the pulse width WD is set over the resolution power of the pulse generation by the PWM signal generator 350, the PWM signal generator 350 cannot generate the pulse according to the pulse width WD. The pulse width WD output from the operator 384 is an integral value obtained by rounding off the calculated value according to Equation (6) given above.

As described above, in the circuit structure of the second embodiment, the operator 384 calculates the pulse width WD according to the sine function. As in the circuit structure of the first embodiment, the driving signals DRVA1 and DRVA2 for driving the motor are generated by PWM control with the binary digital signal SSD output from the magnetic sensor 40 in the circuit structure of the second embodiment.

C. Third Embodiment

Figures 21A, 21B:
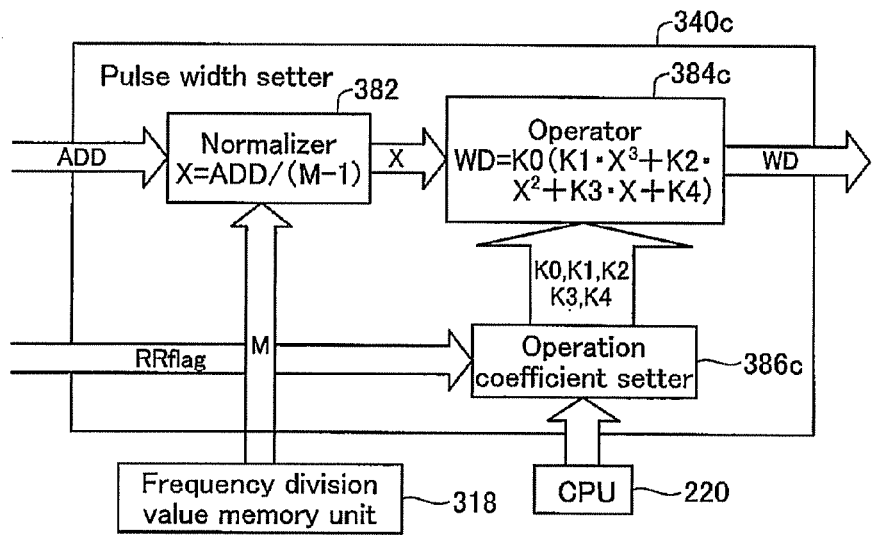
FIG. 21A is a block diagram showing the internal structure of a pulse width setter in a third embodiment.
FIG. 21B is a table showing results of an operation of calculating the pulse width WD from the address value ADD by the pulse width setter.

FIG. 21A is a block diagram showing the internal structure of a pulse width setter 340c in a third embodiment. FIG. 21B is a table showing results of an operation of calculating the pulse width WD from the address value ADD by the pulse width setter 340c. The difference from the second embodiment shown in FIG. 20A is only the number of operation coefficients and the arithmetic expression used for the operation by the operator 384c. Otherwise the circuit structure of the pulse width setter 340c of the third embodiment is the same as the circuit structure of the pulse width setter 340b of the second embodiment.

The pulse width setter 340c includes a normalizer 382, an operator 384c, and an operation coefficient setter 386c. The operation coefficient setter 386c sets five coefficient K0, K1, K2, K3, and K4 used for the operation by the operator 384c according to the value of the speed signal RRflag. Like the second embodiment, it is preferable to connect the operation coefficient setter 386c with the CPU 220 and to allow the values of the five coefficients K0, K1, K2, K3, and K4 stored in the operation coefficient setter 386c to be rewritten to any arbitrary values by the CPU 220. The operator 384c inputs the normalized value X and calculates the pulse width WD according to Equation (7) given below:

$$WD = K0 \times (K1 \cdot X^3 + K2 \cdot X^2 + K3 \cdot X + K4) \tag{7}$$

The table of FIG. 21B shows the results of the operation based on the assumption of the coefficient K0=15, K1=−2.270×10$^{-13}$, K2=−4.685, K3=4.350, and K4=−3.286×10$^{-2}$. The pulse width WD output from the operator 384c is an integral value obtained by rounding off the calculated value according to Equation (7) given above. When the operation result is a negative value, the output pulse width WD is WD=0.

As described above, in the circuit structure of the third embodiment, the operator 384c calculates the pulse width WD according to the cubic function. As in the circuit structure of the second embodiment, the driving signals DRVA1 and DRVA2 for driving the motor are generated by PWM control with the binary digital signal SSD output from the magnetic sensor 40 in the circuit structure of the third embodiment.

D. Fourth Embodiment

Figure 22:
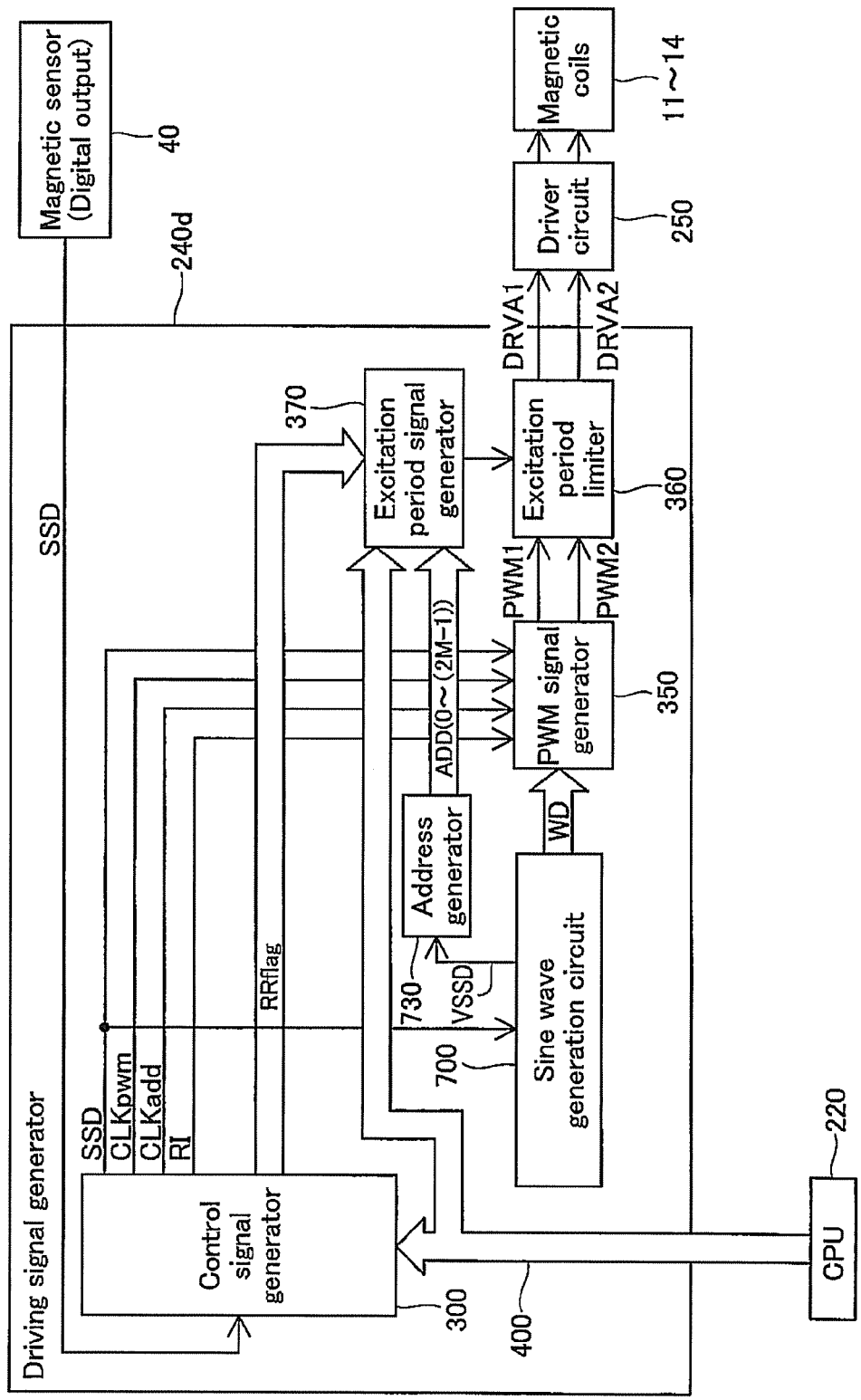
FIG. 22 is a block diagram showing the internal structure of a driving signal generator in a fourth embodiment.

FIG. 22 is a block diagram showing the internal structure of a driving signal generator 240d in a fourth embodiment. The difference from the driving signal generator 240 of the first embodiment shown in FIG. 11 is that an address generator 730 and a sine wave generation circuit 700 are provided in place of the address generator 330 and the pulse width setter 340. Otherwise the circuit structure of the driving signal generator 240d of the fourth embodiment is the same as the circuit structure of the driving signal generator 240 of the first embodiment.

Figure 23:
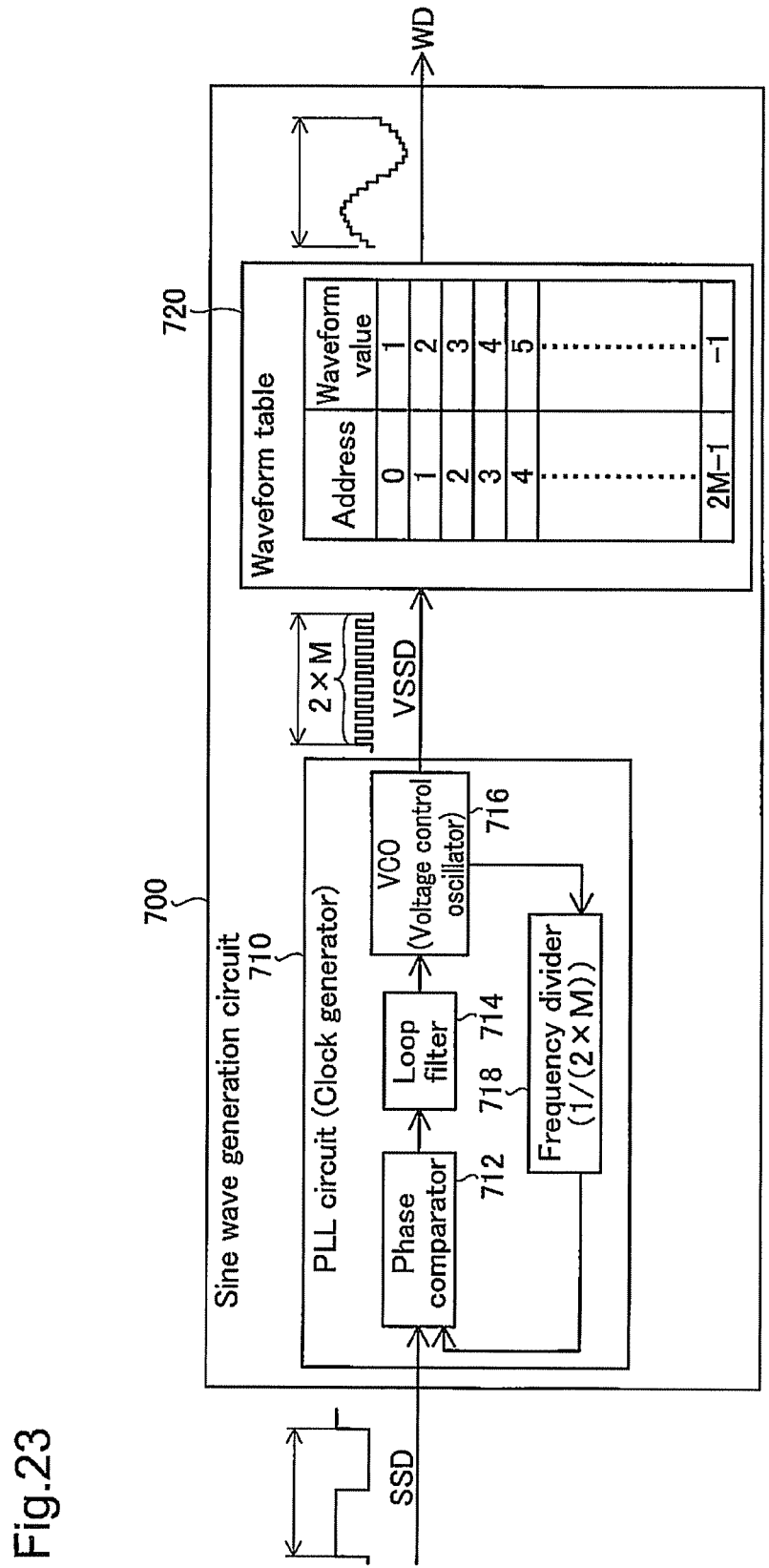
FIG. 23 is a block diagram showing the internal structure of the sine wave generation circuit in the fourth embodiment.

FIG. 23 is a block diagram showing the internal structure of the sine wave generation circuit 700 in the fourth embodiment. The sine wave generation circuit 700 includes a PLL circuit 710 and a waveform table 720. The PLL circuit 710 has a phase comparator 712, a loop filter 714, a voltage control oscillator 716, and a frequency divider 718. The frequency divider 718 stores a frequency division value (2×M). The frequency of a variable clock signal VSSD generated by the PLL circuit 710 is the product of the frequency of a sensor output SSD and the frequency division value (2×M).

The waveform table 720 circularly varies an address from 0 to (2×M−1) corresponding to the pulse of a frequency division signal DVSSD and sequentially outputs the value of a pulse width WD (waveform value signal WD) stored in correlation to each value of the address. The waveform values are set to form one sine wave during generation of 2×M pulses.

The address generator 730 (FIG. 22) circularly generates an address value ADD from 0 to (2×M−1) corresponding to the pulse of the variable clock signal VSSD.

The driving signal generator 240d of the fourth embodiment includes the address generator 730 and the sine wave generation circuit 700, in place of the address generator 330 and the pulse width setter 340. As in the circuit structure of the first embodiment, the driving signals DRVA1 and DRVA2 for driving the motor are generated by PWM control with the binary digital signal SSD output from the magnetic sensor 40 in the circuit structure of the fourth embodiment.

The variable clock signal VSSD of the embodiment is equivalent to the 'division signal' of the invention. The PLL circuit 710 and the waveform table 720 of the embodiment respectively correspond to the 'division signal generator' and the 'pulse width setter' of the invention.

E. Modified Examples

The embodiments and their applications discussed above are to be considered in all aspects as illustrative and not restrictive. There may be many modifications, changes, and alterations without departing from the scope or spirit of the main characteristics of the present invention. Some examples of possible modification are given below.

E1. Modified Example 1

In the circuit structure of the above embodiments, the digital output-type magnetic sensor (hall IC) 40 is used for the position sensor. The magnetic sensor is, however, neither essential nor restrictive but may be replaced by a rotary encoder or any of various sensors outputting a binary position signal representing a relative position of magnetic coils to permanent magnets. Another example of the position sensor is an analog output-type hall element. A comparator converts an analog signal input from the hall element into a binary digital signal, which is supplied as the input to the control signal generator 300 (FIG. 11).

E2. Modified Example 2

In the above embodiments, the pulse width setter 340, 340b, or 340c sets the pulse width WD according to the address value ADD and the value of the speed signal RRflag.

In one modification, the pulse width WD may be set according to only the address value ADD, irrespective of the value of the speed signal RRflag.

E3. Modified Example 3

In the circuit structure of the first embodiment, the excitation period setting table 372 (FIG. 19A) has the four tables provided for setting the excitation period EP, and the pulse width setter 340 (FIG. 14A) has the three tables provided for setting the pulse width WD. The number of the tables used for each setting is not restricted to three or four but may be any arbitrary number of not greater than the number of different values of the speed signal RRflag. The number of different values of the speed signal RRflag is not restricted to the four different stages of 0 to 3 but may be set to any arbitrary number.

In one example, the speed signal RRflag may be varied in sixteen different stages from 0 to 15 and there are sixteen tables provided for setting the excitation period EP and eight tables provided for setting the pulse width WD. In another example, the speed signal RRflag may be varied in sixteen different stages from 0 to 15 and there are eight tables provided for setting the excitation period EP and sixteen tables provided for setting the pulse width WD. The number of different values of the speed signal RRflag, the number of the tables used for setting the excitation period EP, and the number of the tables used for setting the pulse width WD may be all equal to sixteen. In the last case, the excitation period limiter 360 and the excitation period signal generator 370 may be omitted with setting the pulse width WD to values representing the waveforms of the driving signals DRVA1 and DRVA2 generated by the excitation period limiter 360.

E4. Modified Example 4

The five operation coefficients K0, K1, K2, K3, and K4 used for the operation are not restricted to the values specified in the description of the third embodiment but may be set to any normalized values to simulate the back electromotive force waveform generated on the coil. The values of the five coefficients used for the operation may be changed over according to the value of the speed signal RRflag.

E5. Modified Example 5

The pulse width setter 340*b* of the second embodiment and the pulse width setter 340*c* of the third embodiment respectively apply the sine function and the cubic function to calculate the pulse width WD. Another approximate expression simulating the back electromotive force waveform, for example, an expression representing an ellipse, may be used alternatively for the calculation of the pulse width WD. The approximate expression used for the calculation may be switched over according to the value of the speed signal RRflag.

E6. Modified Example 6

A VCO having VCO characteristics as disclosed in U.S. Pat. Nos. 4,975,662 and 5,185,584 filed by the inventors of the present invention is preferably used for the voltage control oscillator 312 included in the PLL circuit 307 rather than a conventional VCO changing over the current gain corresponding to the output frequency.

E7. Modified Example 7

In the embodiments described above, the bus 400 is controlled by the CPU 220. The bus 400 may be replaced by a serial communication bus, such as an I$^2$C bus manufactured by Royal Philips Electronics according to the requirements. Such a serial communication bus is preferable for the drive control circuit constructed by a semiconductor integrated circuit.

E8. Modified Example 8

In the embodiments described above, the drive control circuit is mounted on the single-phase brushless motor. This is, however, not restrictive. The drive control circuit may be mounted on a two-phase, three-phase, or greater-phase brushless motor.

E9. Modified Example 9

In the embodiments described above, the drive control circuit is mounted on the rotary motor. This is, however, not restrictive. The drive control circuit may be mounted on a linear motor.

E10. Modified Example 10

The present invention is applicable to various kinds of devices. For example, the present invention is implemented in a motor in any of various devices such as fan motors, clocks (for driving the hands), drum type washing machines (single rotation), jet coasters, vibrating motors, and the like. Where the present invention is implemented in a fan motor, the various advantages mentioned previously (low power consumption, low vibration, low noise, minimal rotation irregularity, low heat emission, and long life) is particularly notable. Such fan motors can be employed, for example, as fan motors for various devices such as digital display devices, vehicle on-board devices, fuel cell type PCs, fuel cell type digital cameras, fuel cell type video cameras, fuel cell type mobile phones, various other fuel cell-powered devices, and projectors. The motor of the present invention may also be utilized as a motor for various types of household electric appliances and electronic devices. For example, a motor in accordance with the present invention may be employed as a spindle motor in an optical storage device, magnetic storage device, polygon mirror drive, or the like. The motor of the present invention may also be utilized as a motor for a movable body or a robot.

Figure 24:
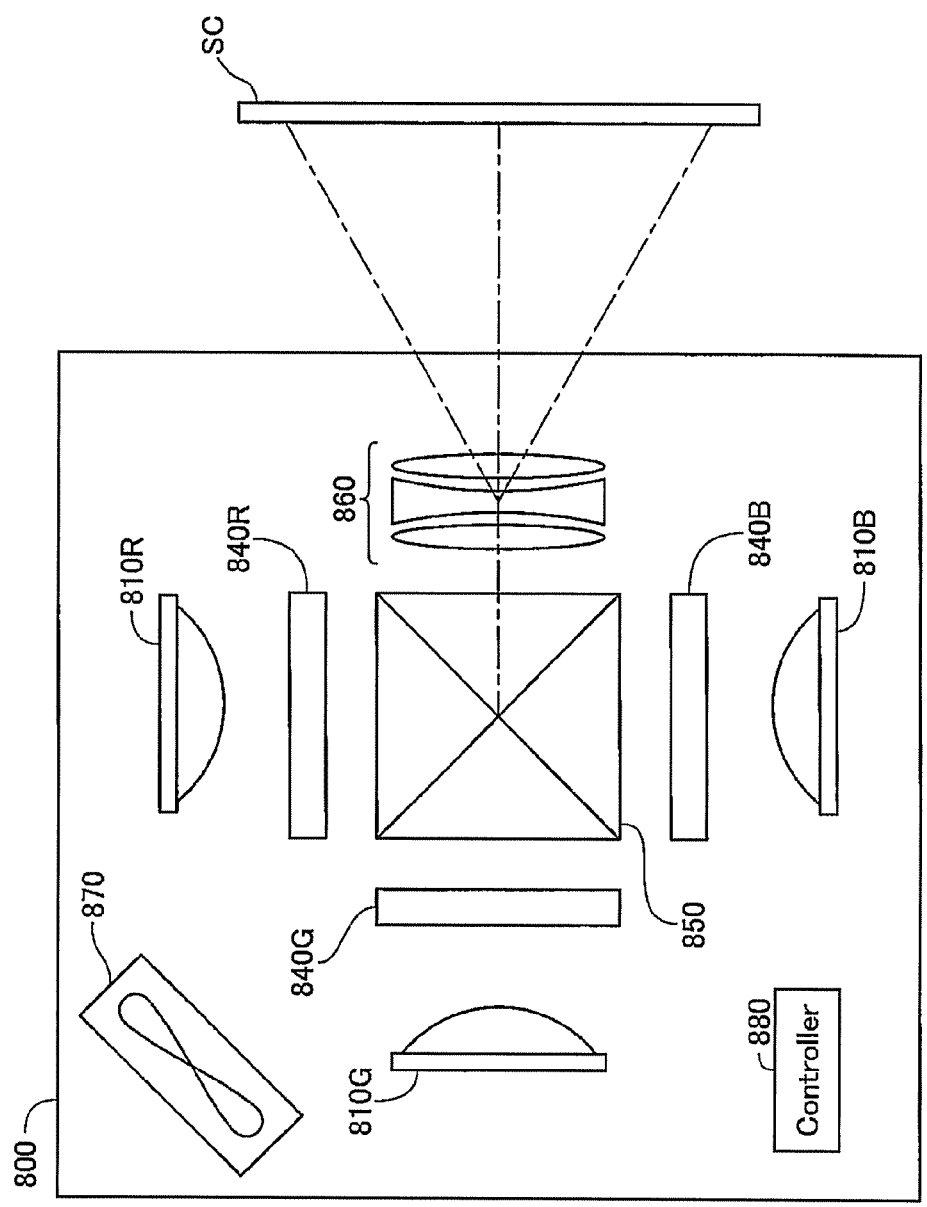
FIG. 24 is an illustration depicting a projector which utilizes a motor according to the present invention.

FIG. 24 is an illustration depicting a projector which utilizes a motor according to the present invention. This projector 800 has three light sources 810R, 810G, 810B for emitting light of the three colors red, green, and blue; liquid crystal light valves 840R, 840G, 840B for modulating light of the three colors; a cross dichroic prism 850 for synthesizing modulated light of the three colors; a projection lens system 860 for projecting light synthesized from the three colors onto a screen SC; a cooling fan 870 for cooling the interior of the projector; and a controller 880 for controlling the entire projector 800. Any of the various brushless motors described above may be used as the motor for driving the cooling fan 870.

Figure 25A:
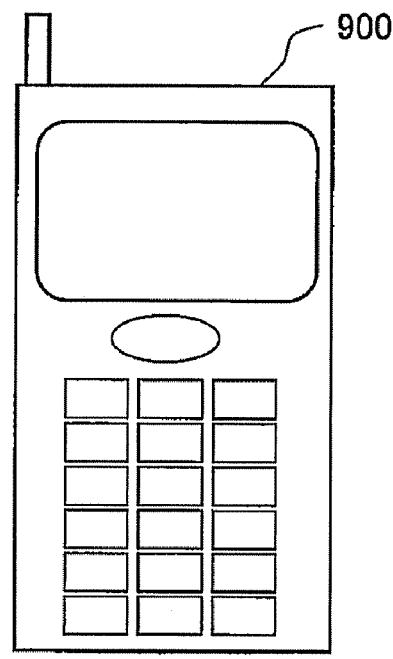
FIGS. 25A to 25C illustrate a fuel cell type mobile phone which utilizes a motor according to the present invention.
Figure 25B:
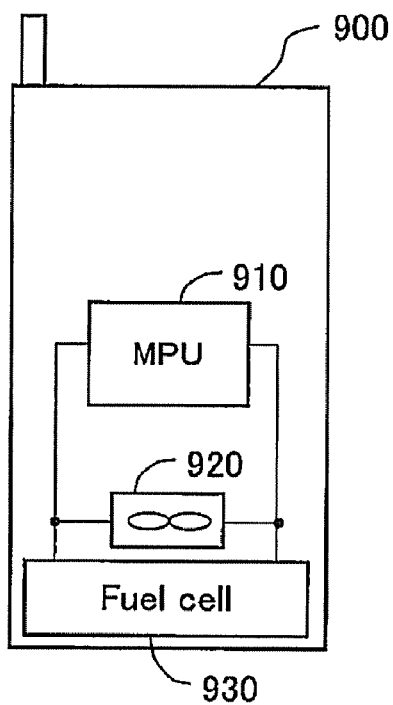
Figure 25C:
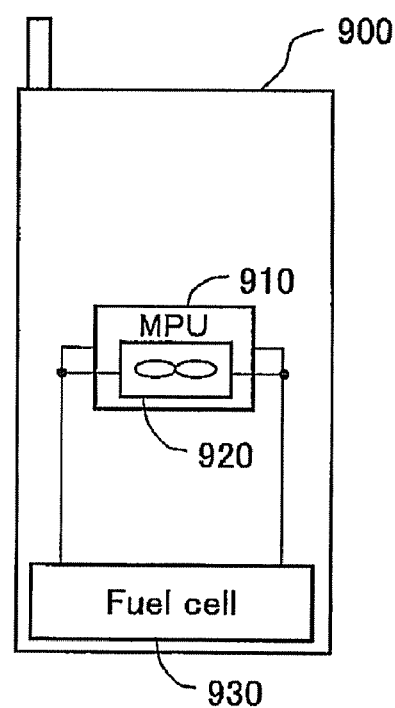

FIGS. 25A to 25C illustrate a fuel cell type mobile phone which utilizes a motor according to the present invention.

FIG. 25A shows an exterior view of a mobile phone 900, and FIG. 25B shows an example of internal configuration. The mobile phone 900 includes an MPU 910 for controlling operation of the mobile phone 900; a fan 1220; and a fuel cell 930. The fuel cell 930 supplies power to the MPU 910 and to the fan 920. The fan 920 blows air into the mobile phone 900 from the outside in order to supply air to the fuel cell 930, or in order to expel moisture evolved in the fuel cell 930 from the inside of the mobile phone 900 to the outside. The fan 920 may also be positioned on the MPU 910 as shown in FIG. 25C, to cool the MPU 910. Any of the various brushless motors described above can be used as the motor for driving the fan 920.

What is claimed is:

1. A circuit structured to drive a motor, comprising:
   a division signal generator that generates a division signal dividing each of a high level period and a low level period of a binary position signal representing a relative position of a magnetic coil to a permanent magnet into a preset number of multiple divisions;
   a pulse width setter that sets a pulse width for PWM control corresponding to each of the multiple divisions represented by the division signal;
   a PWM signal generator that performs PWM control with the set pulse width, thereby generating a PWM signal as a driving signal for driving the motor; and
   a speed signal generator that generates a speed signal representing a relative speed of the permanent magnet to the magnetic coil, based on the position signal,
   wherein the pulse width setter sets the pulse width corresponding to each of the multiple divisions based on the speed signal; and
   wherein the pulse width setter sets the pulse width to a predetermined maximum value in all the multiple divisions when the speed signal does not exceed a preset first threshold value.

2. An electric motor, comprising the circuit according to claim 1.

3. An electric device, comprising the electric motor according to claim 2.

4. The electric device according to claim 3, wherein the electric device is a projector.

5. A fuel cell device, comprising the electric motor according to claim 2.

6. A circuit structured to drive a motor, comprising:
   a division signal generator that generates a division signal dividing each of a high level period and a low level period of a binary position signal representing a relative position of a magnetic coil to a permanent magnet into a preset number of multiple divisions;
   a pulse width setter that sets a pulse width for PWM control corresponding to each of the multiple divisions represented by the division signal;
   a PWM signal generator that performs PWM control with the set pulse width, thereby generating a PWM signal as a driving signal for driving the motor; and
   a speed signal generator that generates a speed signal representing a relative speed of the permanent magnet to the magnetic coil, based on the position signal,
   wherein the pulse width setter sets the pulse width corresponding to each of the multiple divisions based on the speed signal; and
   wherein the pulse width setter sets the pulse width so as to have a largest value in a specific division corresponding to an approximate center of the high level period or the low level period of the position signal, and to decrease with an increase in temporal distance of the division from the specific division corresponding to the approximate center when the speed signal is in a range from a preset first threshold value to a preset second threshold value which is greater than the first threhold value.

7. A circuit structured to drive a motor, comprising:
   a division signal generator that generates a division signal dividing each of a high level period and a low level period of a binary position signal representing a relative position of a magnetic coil to a permanent magnet into a preset number of multiple divisions;
   a pulse width setter that sets a pulse width for PWM control corresponding to each of the multiple divisions represented by the division signal;
   a PWM signal generator that performs PWM control with the set pulse width, thereby generating a PWM signal as a driving signal for driving the motor; and
   a speed signal generator that generates a speed signal representing a relative speed of the permanent magnet to the magnetic coil, based on the position signal,
   wherein the pulse width setter sets the pulse width corresponding to each of the multiple divisions based on the speed signal; and
   wherein the pulse width setter sets the pulse width so as to make a division having a maximum pulse width appear at an earlier timing than a specific division corresponding to an approximate center of the high level period or the low level period of the position signal when the speed signal exceeds a preset second threshold value.

8. A circuit structured to drive a motor, comprising:
   a division signal generator that generates a division signal dividing each of a high level period and a low level period of a binary position signal representing a relative position of a magnetic coil to a permanent magnet into a preset number of multiple divisions;
   a pulse width setter that sets a pulse width for PWM control corresponding to each of the multiple divisions represented by the division signal;
   a PWM signal generator that performs PWM control with the set pulse width, thereby generating a PWM signal as a driving signal for driving the motor;
   a speed signal generator that generates a speed signal representing a relative speed of the permanent magnet to the magnetic coil, based on the position signal; and
   an excitation period setter that sets a preset part of the multiple divisions as a non-excitation period where the PWM signal is disabled as the driving signal and sets a residual part of the multiple divisions as an excitation period where the PWM signal is enabled as the driving signal,
   wherein the pulse width setter sets the pulse width corresponding to each of the multiple divisions based on the speed signal.

9. The circuit according to claim 8, wherein p1 the excitation period setter sets the excitation period and the non-excitation period according to the speed signal.

10. An electric motor, comprising the circuit according to claim 8.

11. An electric device, comprising the electric motor according to claim 10.

12. The electric device according to claim 11, wherein the electric device is a projector.

13. A fuel cell device, comprising the electric motor according to claim 10.

* * * * *